US012464545B2

(12) United States Patent
Babaei

(10) Patent No.: US 12,464,545 B2
(45) Date of Patent: Nov. 4, 2025

(54) ENHANCED RESOURCE ALLOCATION FOR MULTICAST BROADCAST SERVICES

(71) Applicant: TOYOTA JIDOSHA KABUSHIKI KAISHA, Toyota (JP)

(72) Inventor: Alireza Babaei, Fairfax, VA (US)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 19/096,549

(22) Filed: Mar. 31, 2025

(65) Prior Publication Data
US 2025/0254710 A1 Aug. 7, 2025

Related U.S. Application Data

(63) Continuation of application No. 18/028,623, filed as application No. PCT/JP2021/035437 on Sep. 27, 2021.
(Continued)

(51) Int. Cl.
H04W 72/30 (2023.01)
H04W 72/0457 (2023.01)
(Continued)

(52) U.S. Cl.
CPC ....... H04W 72/30 (2023.01); H04W 72/0457 (2023.01); H04W 72/121 (2013.01); H04W 76/28 (2018.02)

(58) Field of Classification Search
CPC ... H04W 72/30; H04W 76/28; H04W 72/121; H04W 72/0457
See application file for complete search history.

(56) References Cited

U.S. PATENT DOCUMENTS 9,860,887 B2 * 1/2018 Yi ............................. H04L 5/14
10,278,207 B2 * 4/2019 Lee ........................ H04W 56/00
(Continued)

FOREIGN PATENT DOCUMENTS

TW 202046752 A * 12/2020 ............ H04B 17/24
WO WO-2016127648 A1 * 8/2016 ............ H04W 72/04

OTHER PUBLICATIONS

ZTE Corporation, "Consideration on SPS for SC-PTM in FeNB-IoT", dated May 11, 2018, pp. 1-13.
(Continued)

Primary Examiner — Parth Patel
(74) Attorney, Agent, or Firm — Finnegan, Henderson, Farabow, Garrett and Dunner, LLP

(57) ABSTRACT

A system, method and apparatus for mobile communications including an enhanced scheduled process is provided. A user equipment (UE) receives multicast broadcast configuration parameters. The UE determines that a first multicast broadcast service is associated with the DRX configuration parameters and that a second multicast broadcast service is not associated with the DRX configuration parameters. The UE receives first multicast broadcast data, associated with the first multicast broadcast service, based on scheduling information determined by monitoring a control channel using the DRX configuration parameters. The UE also receives second multicast broadcast data, associated with the second multicast broadcast service, based on the SPS configuration parameters and without monitoring the control channel for the scheduling information.

11 Claims, 21 Drawing Sheets

Related U.S. Application Data

(60) Provisional application No. 63/084,408, filed on Sep. 28, 2020.

(51) Int. Cl.
*H04W 72/121* (2023.01)
*H04W 76/28* (2018.01)

(56) References Cited

U.S. PATENT DOCUMENTS

| | | | | |
|---|---|---|---|---|
| 11,917,607 | B2* | 2/2024 | Papasakellariou | H04L 1/1671 |
| 12,114,264 | B2* | 10/2024 | Guo | H04W 72/23 |
| 2015/0282126 | A1* | 10/2015 | Park | H04W 72/0446 |
| | | | | 370/329 |
| 2016/0095093 | A1* | 3/2016 | Yi | H04L 5/001 |
| | | | | 370/280 |
| 2017/0195028 | A1* | 7/2017 | Shimezawa | H04B 7/0626 |
| 2018/0026803 | A1* | 1/2018 | Fujishiro | H04W 72/1273 |
| | | | | 370/312 |
| 2018/0092122 | A1* | 3/2018 | Babaei | H04L 1/1822 |
| 2019/0036756 | A1* | 1/2019 | Yi | H04W 72/23 |
| 2019/0182799 | A1* | 6/2019 | Lee | H04W 68/005 |
| 2019/0313436 | A1* | 10/2019 | Lee | H04L 5/0094 |
| 2020/0204291 | A1* | 6/2020 | Awoniyi-Oteri | H04L 5/0055 |
| 2020/0305139 | A1* | 9/2020 | Xu | H04W 72/23 |
| 2020/0389257 | A1* | 12/2020 | Kung | H04W 4/06 |
| 2021/0153236 | A1* | 5/2021 | Yi | H04W 72/1273 |
| 2021/0184812 | A1* | 6/2021 | MolavianJazi | H04W 72/23 |
| 2022/0022067 | A1* | 1/2022 | Kim | H04L 5/0098 |
| 2022/0022136 | A1* | 1/2022 | Hofström | H04W 76/28 |
| 2022/0030659 | A1* | 1/2022 | Kim | H04W 76/19 |
| 2022/0046522 | A1* | 2/2022 | Kim | H04W 76/34 |
| 2022/0095363 | A1* | 3/2022 | Elshafie | H04L 1/1864 |
| 2022/0132555 | A1* | 4/2022 | Blankenship | H04W 72/23 |
| 2022/0338119 | A1* | 10/2022 | Seo | H04W 72/044 |
| 2022/0408389 | A1* | 12/2022 | Wang | H04W 56/0055 |
| 2022/0408514 | A1* | 12/2022 | Luo | H04W 92/18 |
| 2023/0027089 | A1* | 1/2023 | Pelletier | H04W 4/06 |
| 2023/0231692 | A1* | 7/2023 | Baek | H04W 72/30 |
| | | | | 370/329 |
| 2023/0276471 | A1* | 8/2023 | Latheef | H04W 4/06 |
| | | | | 370/312 |
| 2023/0337318 | A1* | 10/2023 | Ko | H04W 76/28 |
| 2023/0345575 | A1* | 10/2023 | Ko | H04W 76/28 |
| 2023/0353987 | A1* | 11/2023 | Babaei | H04L 5/0053 |
| 2023/0371046 | A1* | 11/2023 | Babaei | H04W 72/121 |
| 2023/0380005 | A1* | 11/2023 | Ko | H04W 72/25 |
| 2024/0284494 | A1* | 8/2024 | Kim | H04L 1/08 |

OTHER PUBLICATIONS

Chengdu TD Tech et al, "NR MBS solution for UE in Idle or Inactive state", dated Aug. 7, 2020, pp. 1-5.

Samsung, "On Stage-2 aspects and overview of NR MBS", dated Aug. 7, 2020, pp. 1-4.

3rd Generation Partnership Project, "3GPP TS 38.321 V16.5.0", dated Jun. 2021 (including Sections 5.3, 5.7, 5.15), pp. 1-157.

3rd Generation Partnership Project, "3GPP TS 38.214 V16.6.0", dated Jun. 2021 (including Section 5.1), pp. 1-172.

* cited by examiner

| Transport channel \ Logical channel | BCH | PCH | DL-SCH |
|---|---|---|---|
| BCCH | X | | |
| PCCH | | X | |
| CCCH | | | X |
| DCCH | | | X |
| DTCH | | | X |

FIG. 3A

| Transport channel \ Logical channel | UL-SCH | RACH |
|---|---|---|
| CCCH | X | |
| DCCH | X | |
| DTCH | X | |

FIG. 3B

| Transport channel \ Logical channel | SL-BCH | SL-SCH |
|---|---|---|
| SBCCH | X | |
| SCCH | | X |
| STCH | | X |

| Transport channel \ Physical channel | PDSCH | PDCCH | PBCH |
|---|---|---|---|
| BCH | | | X |
| PCH | X | | |
| DL-SCH | X | | |

FIG. 4B

| Transport channel \ Physical channel | PUSCH | PUCCH | PRACH |
|---|---|---|---|
| UL-SCH | X | | |
| RACH | | | X |

FIG. 4C

| Transport channel \ Physical channel | PSSCH | PSCCH | PSFCH | PSBCH |
|---|---|---|---|---|
| SL-BCH | | | | X |
| SL-SCH | X | | | |

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

ENHANCED RESOURCE ALLOCATION FOR MULTICAST BROADCAST SERVICES

CROSS-REFERENCE TO RELATED APPLICATIONS

This application is a continuation of U.S. patent application Ser. No. 18/028,623, which is a national stage of International Application No. PCT/JP2021/035437, filed on Sep. 27, 2021, and which claims the benefit of provisional Patent Application No. 63/084,408, filed on Sep. 28, 2020, each of which is hereby incorporated by reference herein in its entirety.

TECHNICAL FIELD

The disclosure relates to a method of enhancing a scheduling process for multicast broadcast services (MBS).

BACKGROUND ART

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

SUMMARY OF INVENTION

In some embodiments of this disclosure, a method of enhancing a scheduling process for multicast broadcast services is provided. The method includes: receiving, by a user equipment (UE), multicast broadcast configuration parameters, including: discontinuous reception (DRX) configuration parameters associated with one or more of the MBS; and semi-persistent scheduling (SPS) configuration parameters; determining, by the UE, a first multicast broadcast service is associated with the DRX configuration parameters; determining, by the UE, a second multicast broadcast service is not associated with the DRX configuration parameters; receiving, by the UE, first multicast broadcast data, associated with the first multicast broadcast service, based on scheduling information determined by monitoring a control channel using the DRX configuration parameters; and receiving, by the UE, second multicast broadcast data, associated with the second multicast broadcast service, based on the SPS configuration parameters and without monitoring the control channel for the scheduling information.

BRIEF DESCRIPTION OF DRAWINGS

FIG. 3A, FIG. 3B and FIG. 3C show example mappings between logical channels and transport channels in downlink, uplink and sidelink, respectively, according to some aspects of one or more exemplary embodiments of the present disclosure.

FIG. 4A, FIG. 4B and FIG. 4C show example mappings between transport channels and physical channels in downlink, uplink and sidelink, respectively, according to some aspects of one or more exemplary embodiments of the present disclosure.

FIG. 6 shows example physical signals in downlink, uplink and sidelink according to some aspects of one or more exemplary embodiments of the present disclosure.

DESCRIPTION OF EMBODIMENTS

Figure 1:
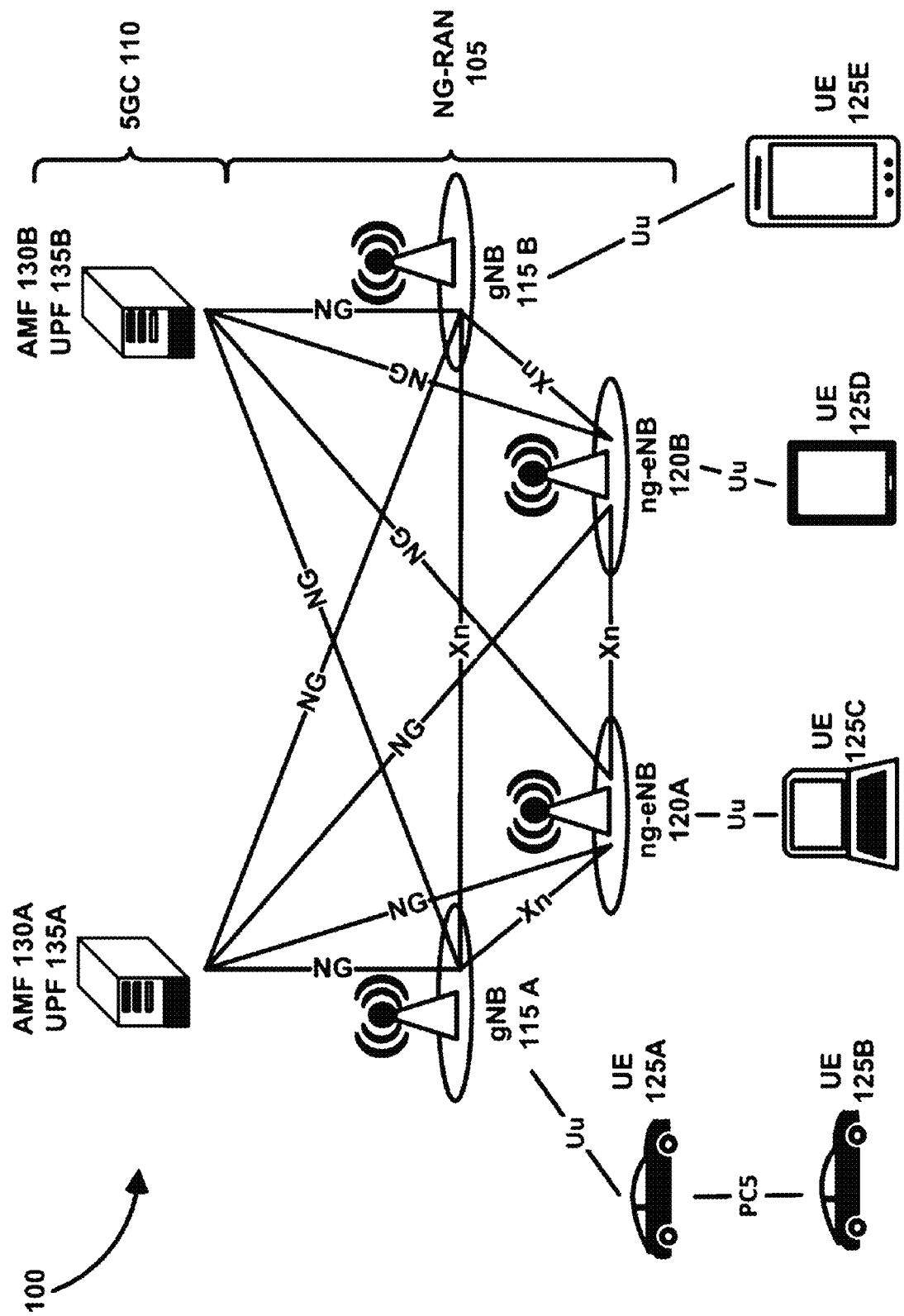
FIG. 1 shows an example of a system of mobile communications according to some aspects of one or more exemplary embodiments of the present disclosure.

FIG. 1 shows an example of a system of mobile communications 100 according to some aspects of one or more exemplary embodiments of the present disclosure. The system of mobile communication 100 may be operated by a wireless communications system operator such as a Mobile Network Operator (MNO), a private network operator, a Multiple System Operator (MSO), an Internet of Things (IoT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IoT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of PAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The PAN implements a Radio Access Technology (RAT) and resides between User Equipments (UEs) 125 (e.g., UE 125A-UE 125E) and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UEs 125 and the PAN (e.g., the NG-RAN 105) may be referred to as Access Stratum (AS) and the functional layer between the UEs 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of the UEs 125 include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for the UEs 125 such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that used the UMTS RAT. A RAN node may be referred to as an evolved Node B (eNB) in a RAN that uses LTE/EUTRA RAT. For the illustrative example of the system of mobile communications 100 in FIG. 1, the nodes of the NG-RAN 105 may be either a next generation Node B (gNB) 115 (e.g., gNB 115A, gNB 115B) or a next generation evolved Node B (ng-eNB) 120 (e.g., ng-eNB 120A, ng-eNB 120B). In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and General Packet Radio Service (GPRS) Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 (e.g., AMF 130A, AMF 130B) of the 5GC 110 by means of the NG-C interface and to a User Plane Function (UPF) 135 (e.g., UPF 135A, UPF 135B) of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication. PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the medium access control (MAC) layer into two-bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two-bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
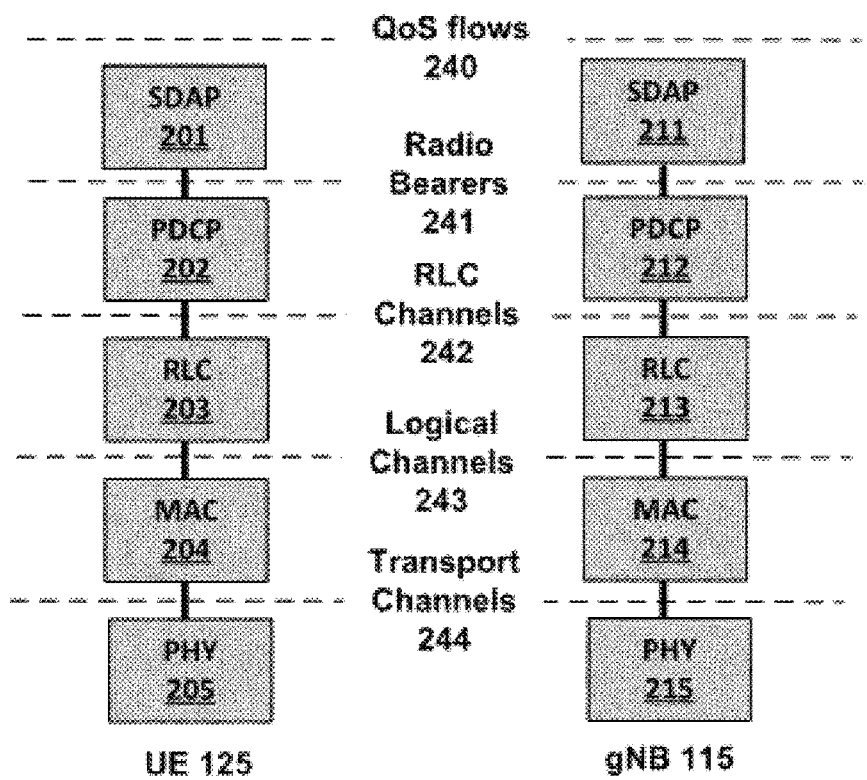
FIG. 2A and FIG. 2B show examples of radio protocol stacks for user plane and control plane, respectively, according to some aspects of one or more exemplary embodiments of the present disclosure.
Figure 2B:
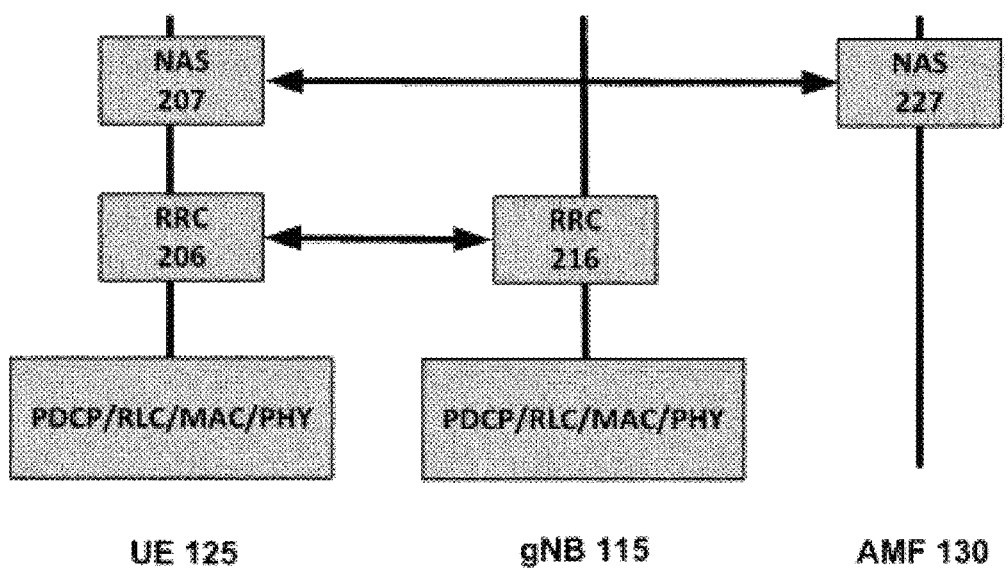

FIG. 2A and FIG. 2B show examples of radio protocol stacks for user plane and control plane, respectively, according to some aspects of one or more exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of one or more exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by predefined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of one or more exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and Channel State Information (CSI) feedback triggers, etc. At least six Orthogonal Frequency Division Multiplexing (OFDM) symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may be mapped to the PSCCH.

Figure 5A:
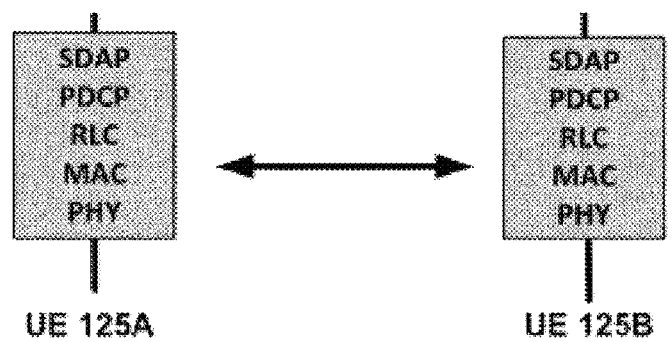
FIG. 5A, FIG. 5B, FIG. 5C and FIG. 5D show examples of radio protocol stacks for NR sidelink communication according to some aspects of one or more exemplary embodiments of the present disclosure.
Figure 5B:
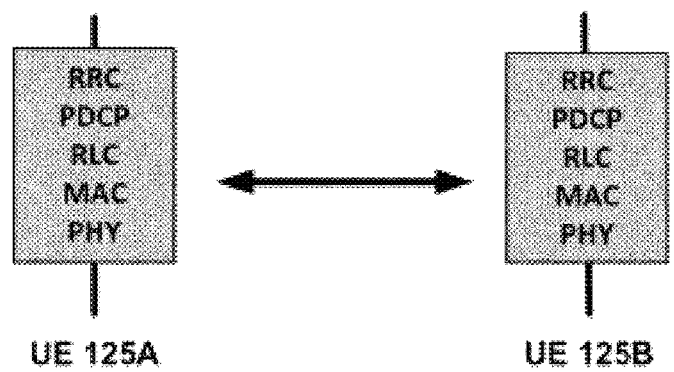
Figure 5C:
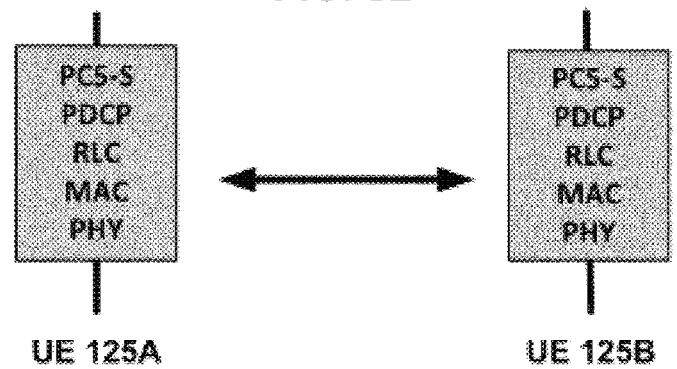
Figure 5D:
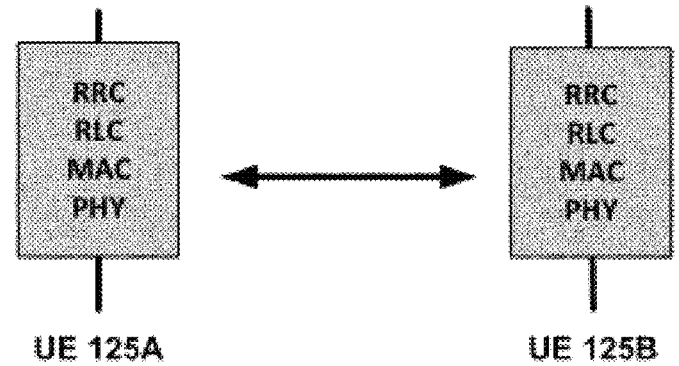

FIG. 5A, FIG. 5B, FIG. 5C and FIG. 5D show examples of radio protocol stacks for NR sidelink communication according to some aspects of one or more exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of one or more exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC control element (CE). The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
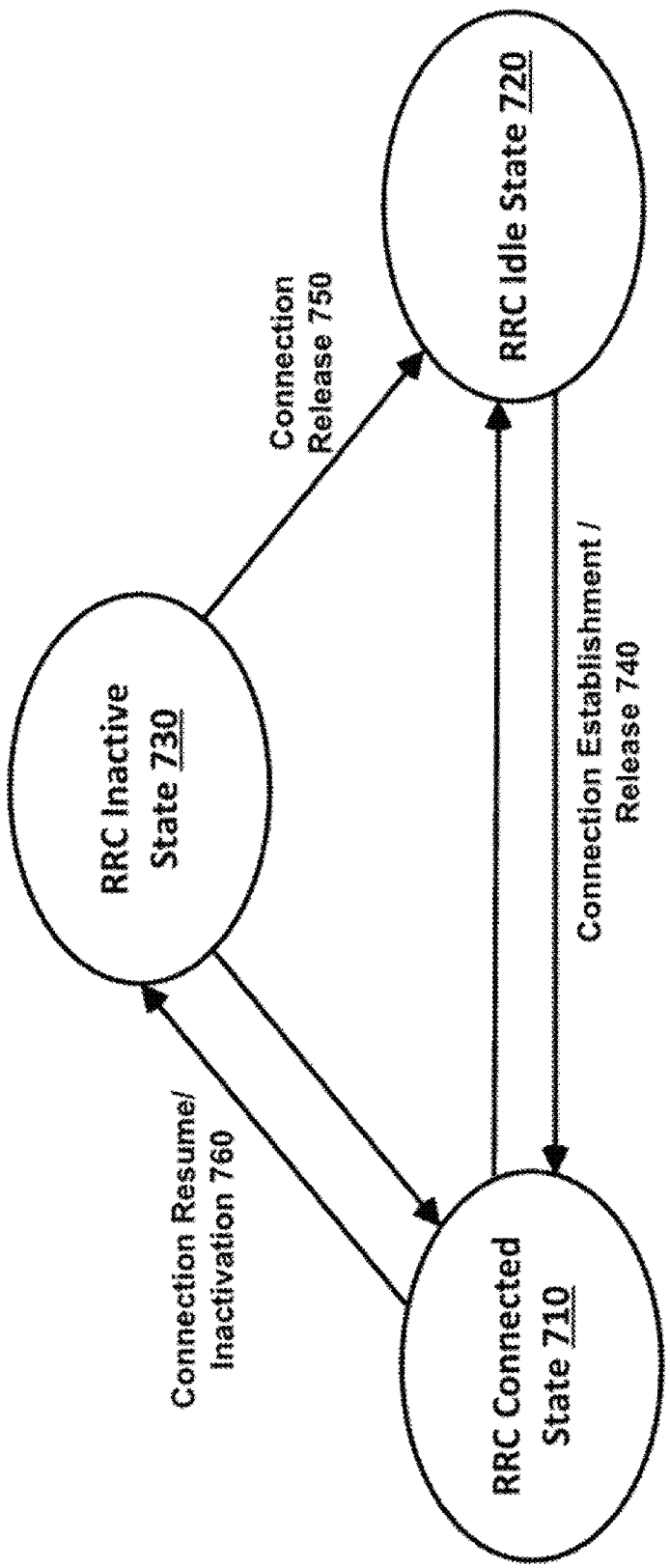
FIG. 7 shows examples of Radio Resource Control (RRC) states and transitioning between different RRC states according to some aspects of one or more exemplary embodiments of the present disclosure.

FIG. 7 shows examples of Radio Resource Control (RRC) states and transitioning between different RRC states according to some aspects of one or more exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
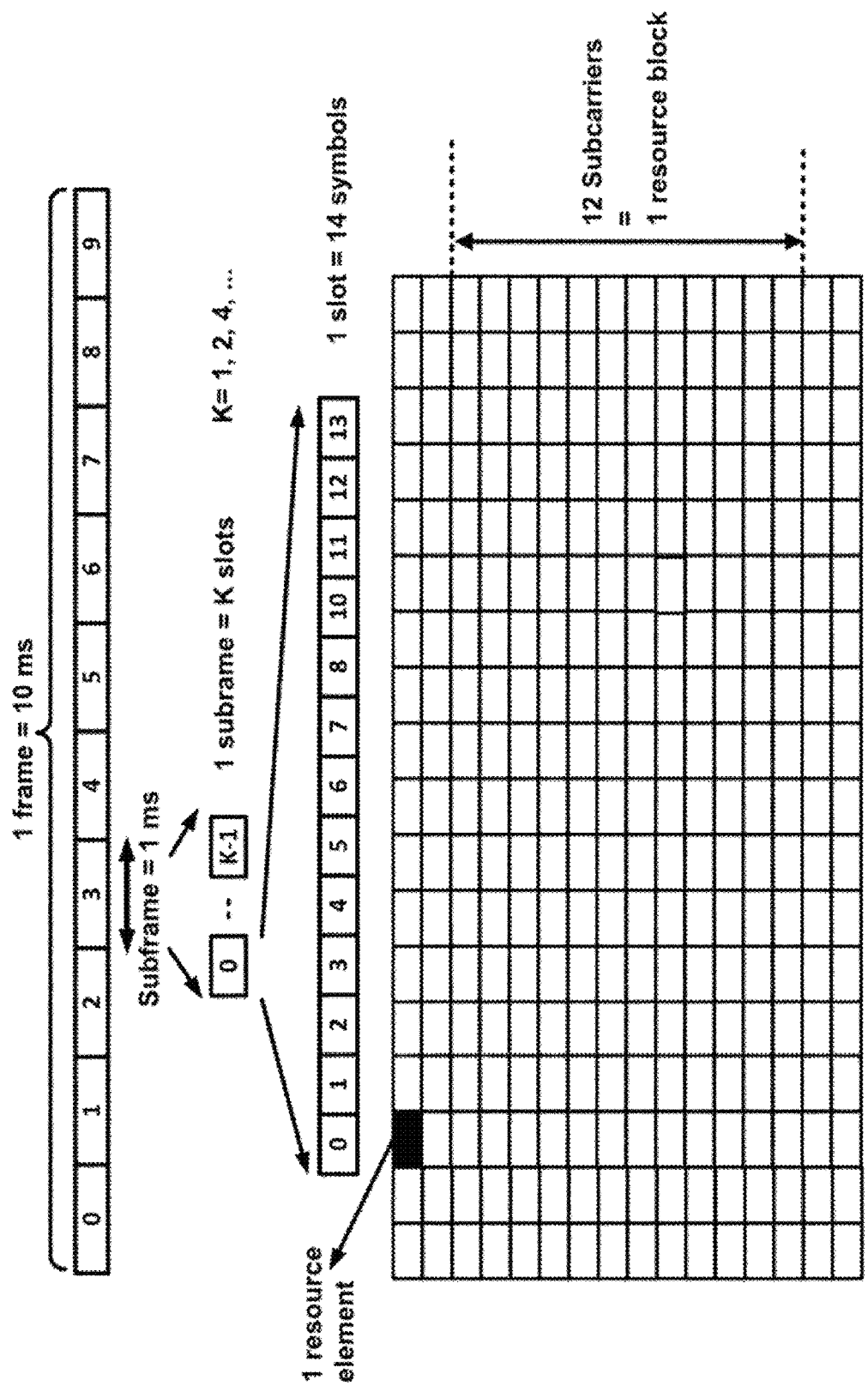
FIG. 8 shows example frame structure and physical resources according to some aspects of one or more exemplary embodiments of the present disclosure.

FIG. 8 shows example frame structure and physical resources according to some aspects of one or more exemplary embodiments of the present disclosure. The downlink or uplink or sidelink transmissions may be organized into frames with 10 ms duration, consisting of ten (0 to 9) 1 ms subframes. Each subframe may consist of k slots (k=1, 2, 4, . . . ), wherein the number of slots k per subframe may depend on the subcarrier spacing of the carrier on which the transmission takes place. The slot duration may be 14 (0 to 13) symbols with Normal Cyclic Prefix (CP) and 12 symbols with Extended CP and may scale in time as a function of the used sub-carrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example, during two, four, or seven OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
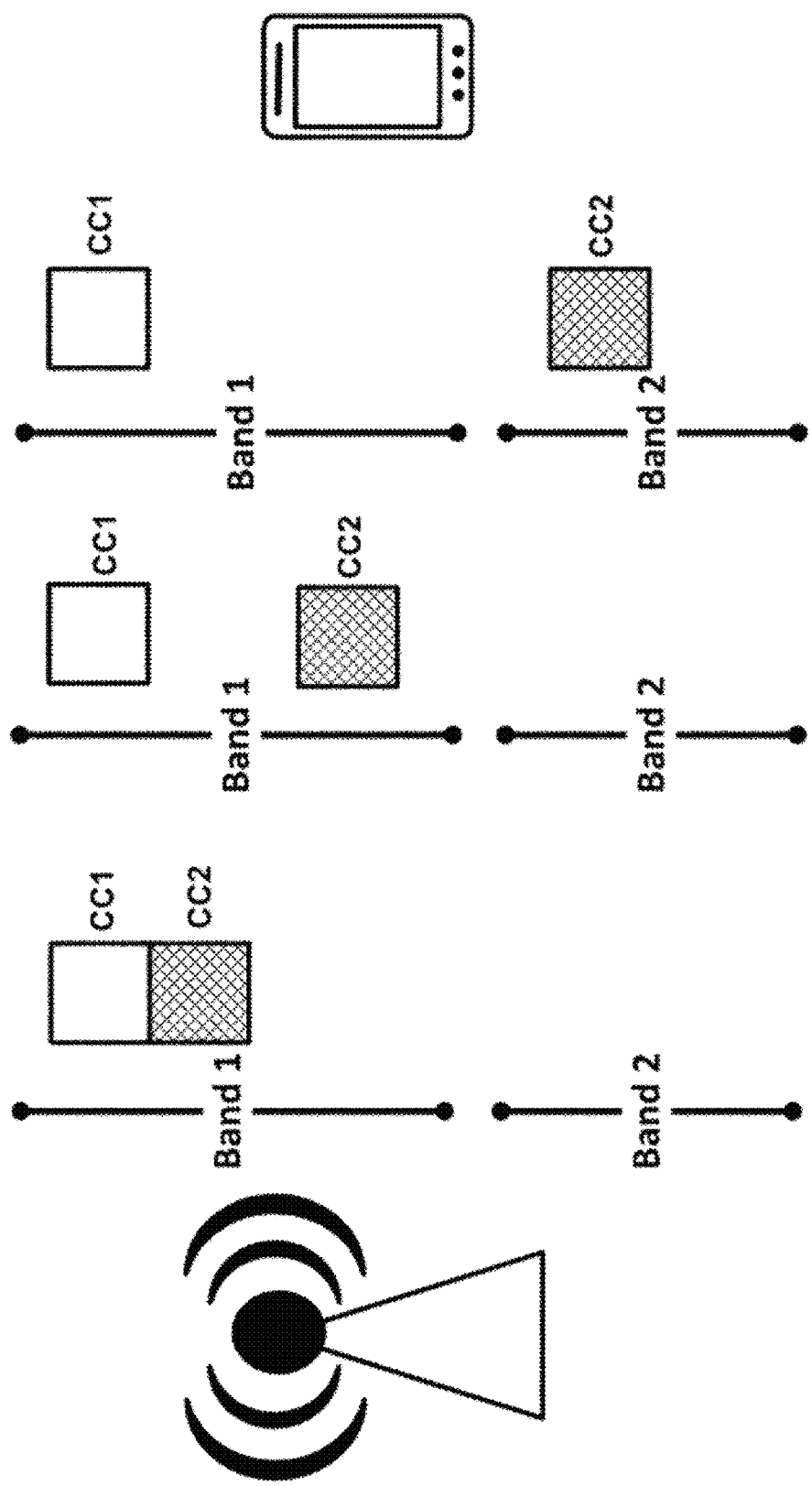
FIG. 9 shows example component carrier configurations in different carrier aggregation scenarios according to some aspects of one or more exemplary embodiments of the present disclosure.

FIG. 9 shows example component carrier configurations in different carrier aggregation scenarios according to some aspects of one or more exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary. Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
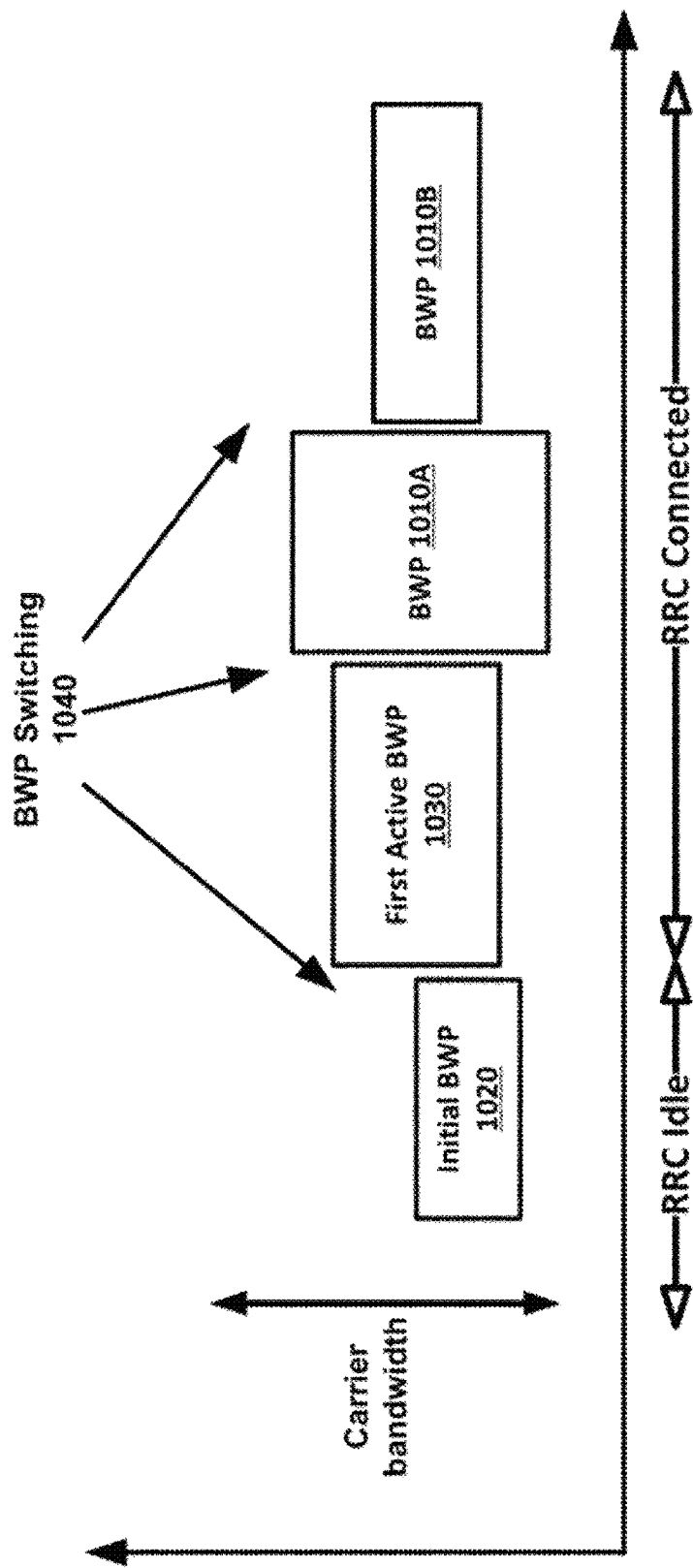
FIG. 10 shows example bandwidth part configuration and switching according to some aspects of one or more exemplary embodiments of the present disclosure.

FIG. 10 shows example bandwidth part configuration and switching according to some aspects of one or more exemplary embodiments of the present disclosure. The UE may be configured with one or more Bandwidth Parts (BWPs) 1010 (e.g., 1010A, 1010B) on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example, through BWP switching 1040, the receive and transmit bandwidth of a UE may not be as large as the bandwidth of the cell and may be adjusted. For example, the width may be ordered to change (e.g., to shrink during period of low activity to save power); the location may move in the frequency domain (e.g., to increase scheduling flexibility); and the subcarrier spacing may be ordered to change (e.g., to allow different services). The first active BWP 1030 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
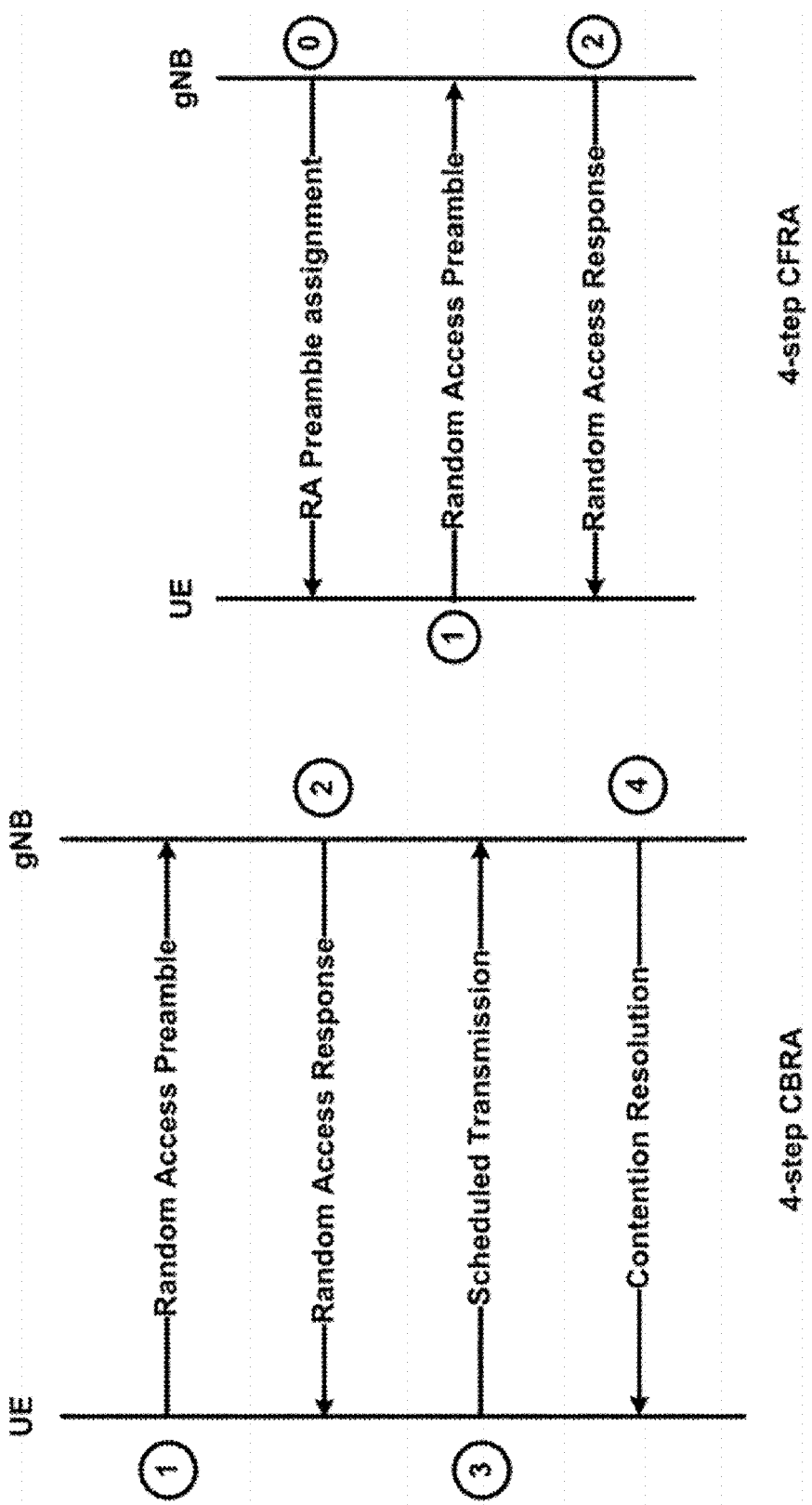
FIG. 11 shows example four-step contention-based and contention-free random access processes according to some aspects of one or more exemplary embodiments of the present disclosure.
Figure 12:
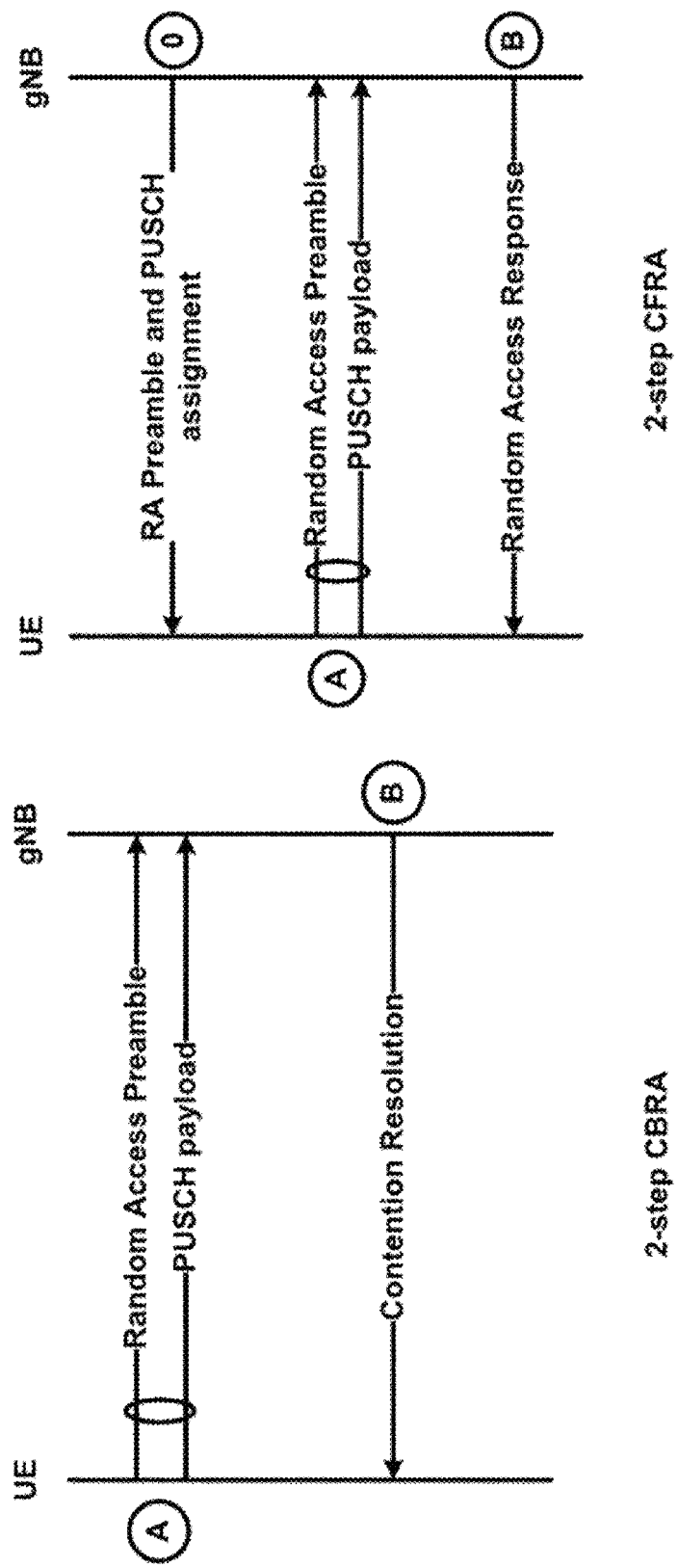
FIG. 12 shows example two-step contention-based and contention-free random access processes according to some aspects of one or more exemplary embodiments of the present disclosure.

FIG. 11 shows example four-step contention-based random access (CBRA) and contention-free random access (CFRA) processes according to some aspects of one or more exemplary embodiments of the present disclosure. FIG. 12 shows example two-step contention-based random access (CBRA) and contention-free random access (CFRA) processes according to some aspects of one or more exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g., handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (PA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH (Step 1 of CBRA in FIG. 11). After MSG1 transmission, the UE may monitor for a response from the network within a configured window (Step 2 of CBRA in FIG. 11). For CFRA, dedicated preamble for MSG1 transmission may be assigned by the network (Step 0 of CFRA of FIG. 11) and upon receiving Random Access Response (RAR) from the network, the UE may end the random access procedure as shown in FIG. 11 (Steps 1 and 2 of CFRA in FIG. 11). For CBRA, upon reception of the random access response (Step 2 of CBRA in FIG. 11), the UE may send MSG3 using the uplink grant scheduled in the random access response (Step 3 of CBRA in FIG. 11) and may monitor contention resolution as shown in FIG. 11 (Step 4 of CBRA in FIG. 11). If contention resolution is not successful after MSG3 (re)transmission(s), the UE may go back to MSG1 transmission.

The MSGA of the 2-step RA type may include a preamble on PRACH and a payload on PUSCH (e.g., Step A of CBRA in FIG. 12). After MSGA transmission, the UE may monitor for a response from the network within a configured window. For CFRA, dedicated preamble and PUSCH resource may be configured for MSGA transmission (Steps 0 and A of CFRA in FIG. 12) and upon receiving the network response (Step B of CFRA in FIG. 12), the UE may end the random access procedure as shown in FIG. 12. For CBRA, if contention resolution is successful upon receiving the network response (Step B of CBRA in FIG. 12), the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
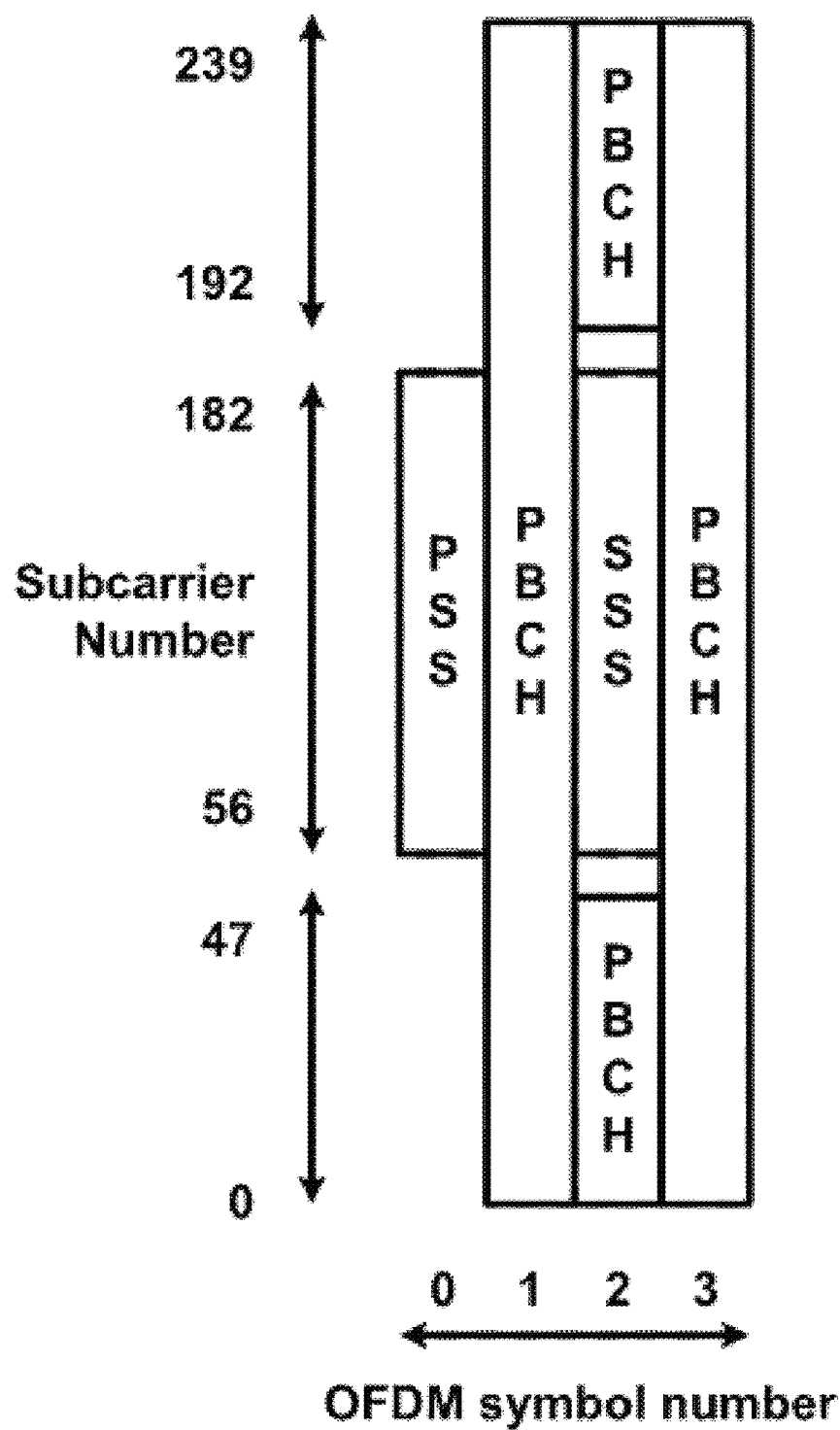
FIG. 13 shows example time and frequency structure of Synchronization Signal and Physical Broadcast Channel (PBCH) Block (SSB) according to some aspects of one or more exemplary embodiments of the present disclosure.

FIG. 13 shows example time and frequency structure of Synchronization Signal and Physical Broadcast Channel (PBCH) Block (SSB) according to some aspects of one or more exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e., using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
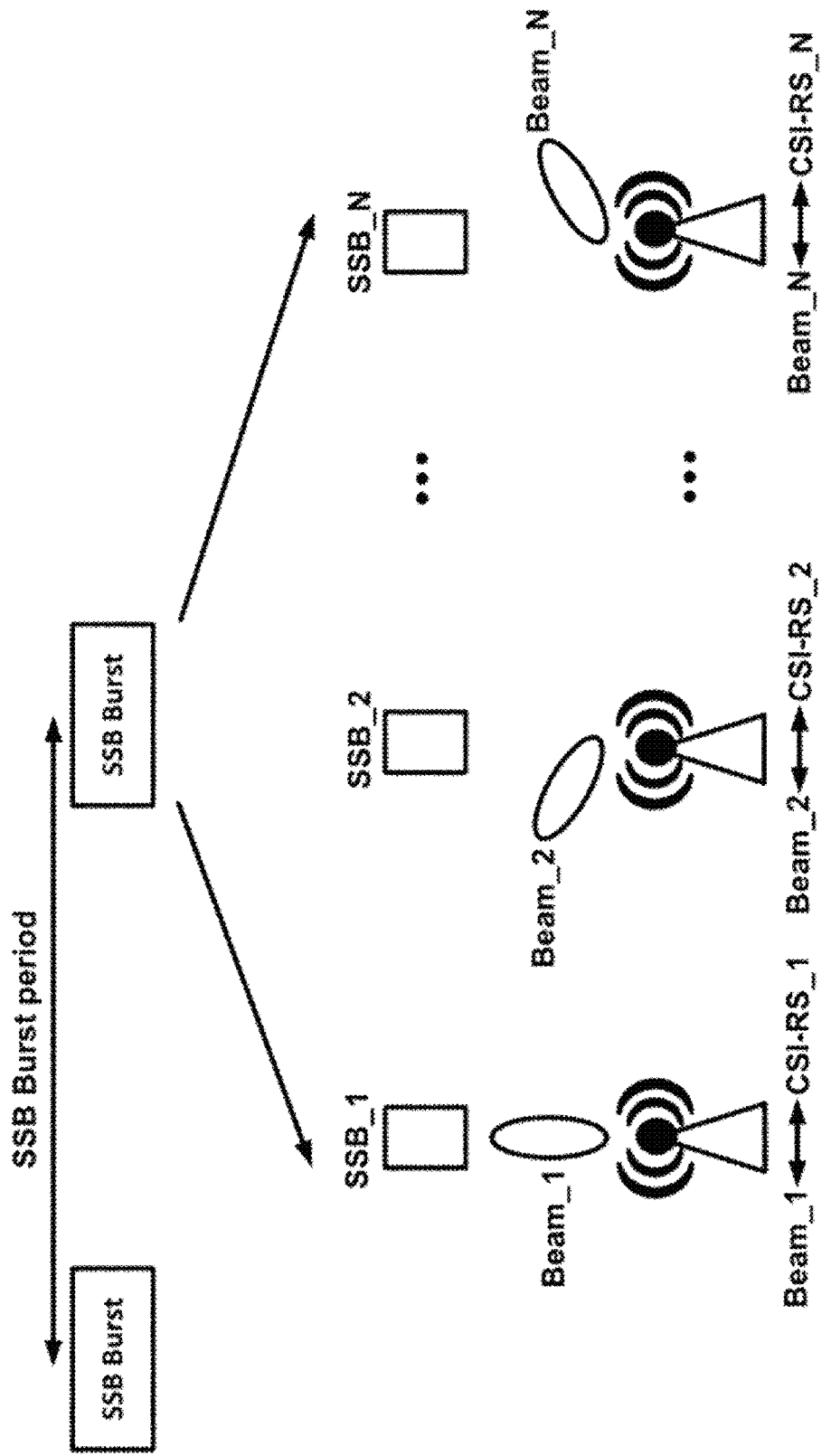
FIG. 14 shows example SSB burst transmissions according to some aspects of one or more exemplary embodiments of the present disclosure.

FIG. 14 shows example SSB burst transmissions according to some aspects of one or more exemplary embodiments of the present disclosure. An SSB burst may include N SSBs (e.g., SSB_1, SSB_2, . . . , SSB_N) and each SSB of the N SSBs may correspond to a beam (e.g., Beam_1, Beam_2, . . . , Beam_N). The SSB bursts may be transmitted according to a periodicity (e.g., SSB burst period). During a contention-based random access process, a UE may perform a random access resource selection process, wherein the UE first selects an SSB before selecting an RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource (e.g., CSI-RS_1, CSI-RS_2, . . . , CSI-RS_N). A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depend on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
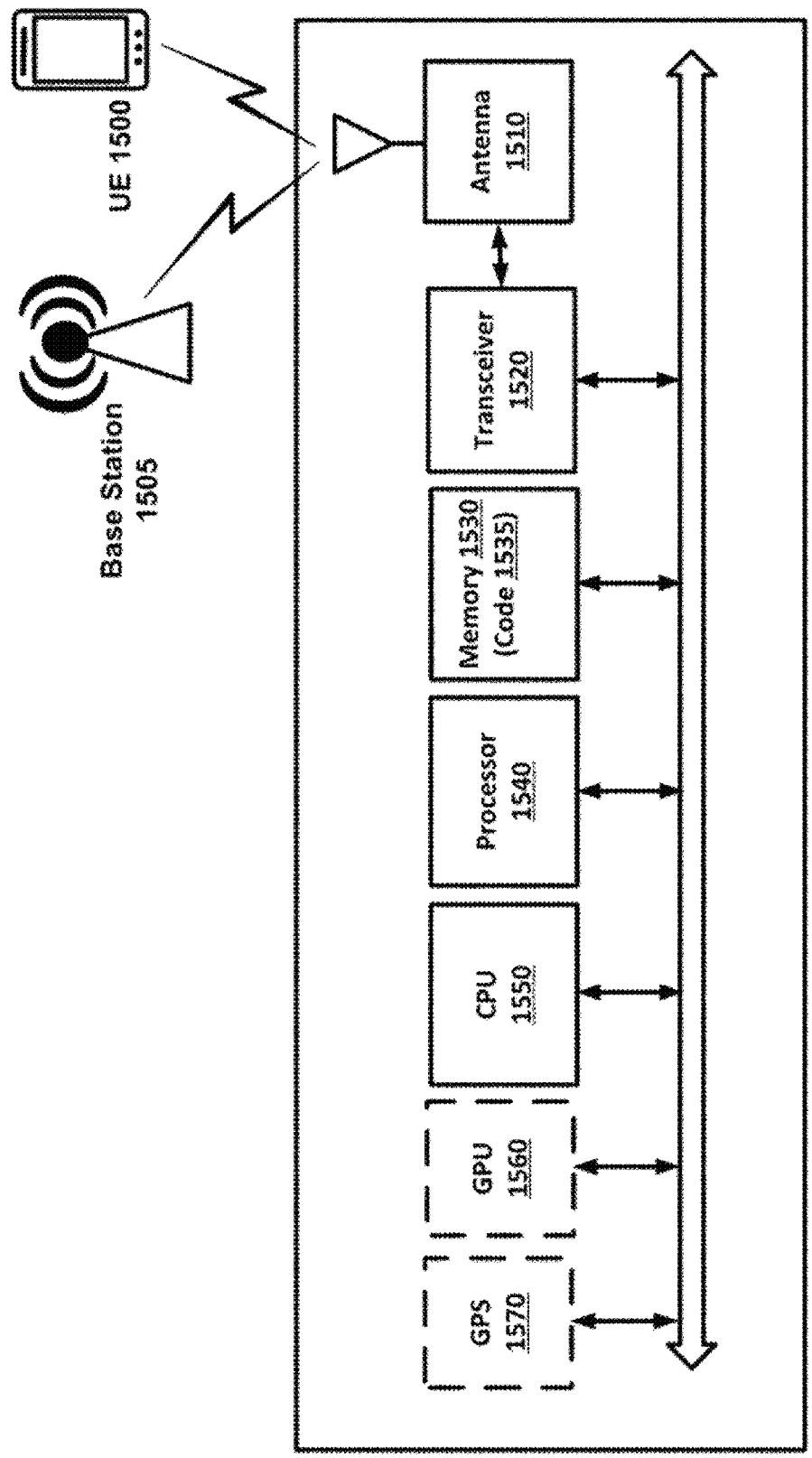
FIG. 15 shows example components of a user equipment and a base station for transmission and/or reception according to some aspects of one or more exemplary embodiments of the present disclosure.

FIG. 15 shows example components of a user equipment and a base station for transmission and/or reception according to some aspects of one or more exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment (UE) 1500. Accordingly, the components illustrated in FIG. 15 are not necessarily limited to either a UE or base station.

The Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 1510 may enable a massive MIMO configuration with tens or hundreds of antenna elements. The Antenna 1510 may enable other multi-antenna techniques such as beamforming. In some embodiments, depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antenna 1510 for transmission, and to demodulate packets received from the Antenna 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The CPU 1550 may perform basic arithmetic, logic, controlling, and Input/output (I/O) operations specified by the computer instructions in the Memory 1530. The UE 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the UE 1500 and/or the base station 1505. The GPS 1570 may be used for enabling location-based services or other services for example based on geographical position of the UE 1500.

In some example, MBS services may be enabled via single-cell transmission. MBS may be transmitted in the coverage of a single cell. One or more Multicast/Broadcast control channels (e.g., MCCHs) and one or more Multicast/Broadcast data channels (e.g., MTCHs) may be mapped on DL-SCH. The scheduling may be done by the gNB. The Multicast/Broadcast control channel and the Multicast/Broadcast data channel transmissions may be indicated by a logical channel specific RNTI on PDCCH. In some examples, a one-to-one mapping between a service identifier such as a temporary mobile group identifier (TMGI) and a PAN level identifier such as a group identifier (G-RNTI) may be used for the reception of the DL-SCH to which a Multicast/Broadcast data channel may be mapped. In some examples, a single transmission may be used for DL-SCH associated with the Multicast/Broadcast control channel and/or the Multicast/Broadcast data channel transmissions and HARQ or RLC retransmissions may not be used and/or an RLC Unacknowledged Mode (RLC UM) may be used. In other examples some feedback (e.g., HARQ feedback or RLC feedback) may be used for transmissions via Multicast/Broadcast control channel and/or Multicast/Broadcast data channels.

In some example, for Multicast/Broadcast data channel, the following scheduling information may be provided on Multicast/Broadcast control channel: a Multicast/Broadcast data channel scheduling cycle, a Multicast/Broadcast data channel on-duration (e.g., duration that the UE waits for, after waking up from DRX, to receive PDCCHs), a Multicast/Broadcast data channel inactivity timer (e.g., duration that the UE waits to successfully decode a PDCCH, from the last successful decoding of a PDCCH indicating the DL-SCH to which this Multicast/Broadcast data channel is mapped, failing which it re-enters DRX).

In some examples, one or more UE identities may be related to MBS transmissions. The one or more identities may comprise at least one of: one or more first RNTIs that identify transmissions of the Multicast/Broadcast control channel; one or more second RNTIs that identify transmissions of a Multicast/Broadcast data channels. The one or more first RNTIs that identify transmissions of the Multicast/Broadcast control channel may comprise a single cell RNTI (SC-RNTI, other names may be used). The one or more second RNTIs that identify transmissions of a Multicast/Broadcast data channels may comprise a G-RNTI (nG-RNTI or other names may be used).

In some examples, one or more logical channels may be related to MBS transmissions. The one or more logical channels may comprise a Multicast/Broadcast control channel. The Multicast/Broadcast control channel may be a point-to-multipoint downlink channel used for transmitting MBS control information from the network to the UE, for one or several Multicast/Broadcast data channel. This channel may be used by UEs that receive or are interested to receive MBS. The one or more logical channels may comprise a Multicast/Broadcast data channel. This channel may be a point-to-multipoint downlink channel for transmitting MBS traffic data from the network.

Figure 16:
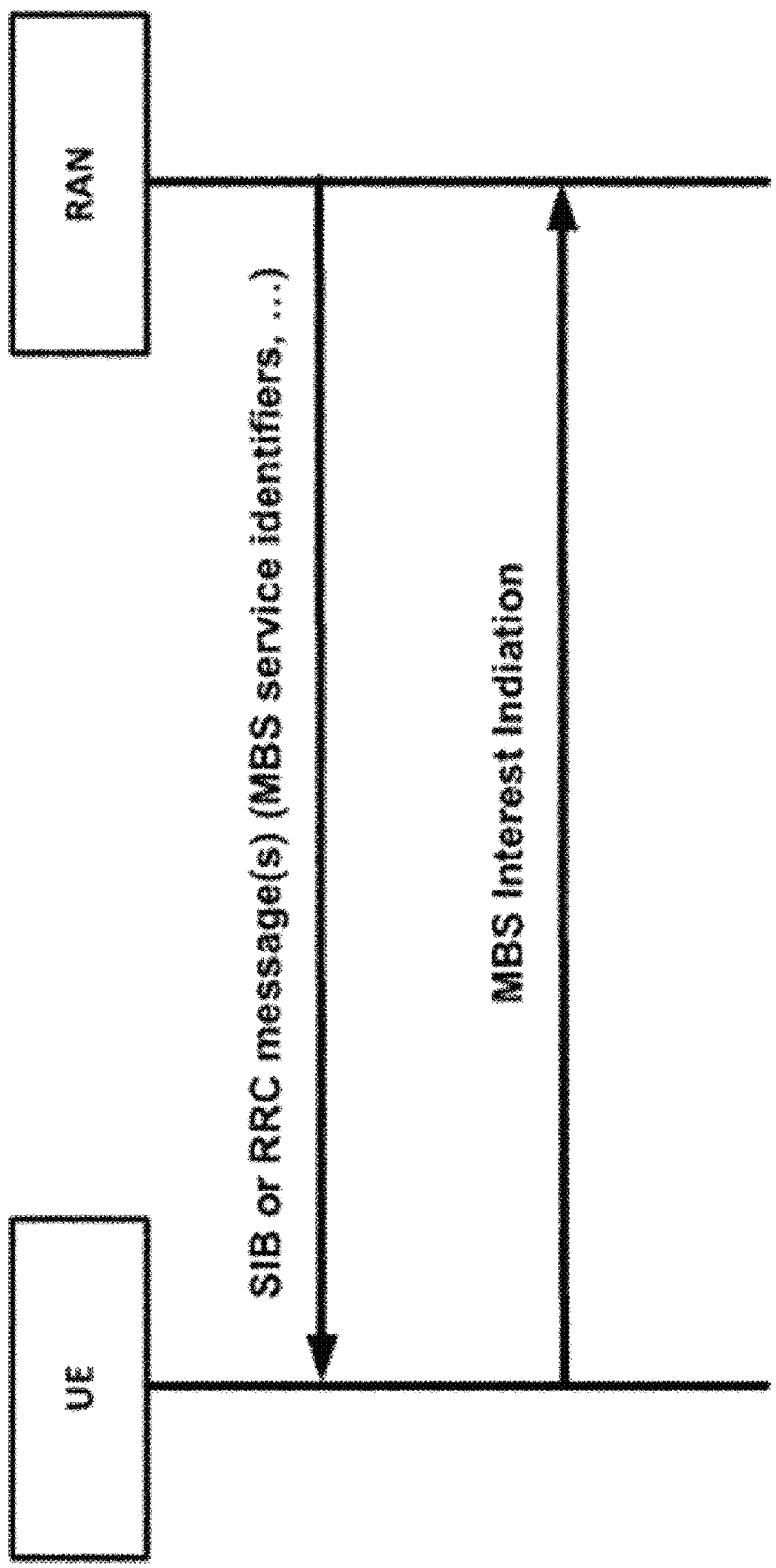
FIG. 16 shows an example multicast broadcast service (MBS) interest indication process according to some aspects of some of various exemplary embodiments of the present disclosure.

In some examples, a procedure may be used by the UE to inform RAN that the UE is receiving or is interested to receive MBS service(s) via an MBS radio bearer, and if so, to inform the 5G RAN about the priority of MBS versus unicast reception or MBS service(s) reception in receive only mode. An example is shown in FIG. 16. The UE may transmit a message (e.g., an MBS interest indication message) to inform RAN that the UE is receiving/interested to receive or no longer receiving/interested to receive MBS service(s). The UE may transmit the message based on receiving one or more messages (e.g., a SIB message or a unicast RRC message) from the network for example indicating one or more MBS Service Area Identifiers of the current and/or neighboring carrier frequencies.

In some examples, the UE may consider an MBS service to be part of the MBS services of interest if the UE is capable of receiving MBS services (e.g., via a single cell point to multipoint mechanism); and/or the UE is receiving or interested to receive this service via a bearer associated with MBS services; and/or one session of this service is ongoing or about to start; and/or at least one of the one or more MBS service identifiers indicated by network is of interest to the UE.

In some examples, control information for reception of MBS services may be provided on a specific logical channel: (e.g., a MCCH). The MCCH may carry one or more configuration messages which indicate the MBS sessions that are ongoing as well as the (corresponding) information on when each session may be scheduled, e.g., scheduling period, scheduling window and start offset. The one or more configuration messages may provide information about the neighbor cells transmitting the MBS sessions which may be ongoing on the current cell. In some examples, the UE may receive a single MBS service at a time, or more than one MBS services in parallel.

In some example, the MCCH information (e.g., the information transmitted in messages sent over the MCCH) may be transmitted periodically, using a configurable repetition period. The MCCH transmissions (and the associated radio resources and MCS) may be indicated on PDCCH.

In some examples, change of MCCH information may occur at specific radio frames/subframes/slots and/or a modification period may be used. For example, within a modification period, the same MCCH information may be transmitted a number of times, as defined by its scheduling (which is based on a repetition period). The modification period boundaries may be defined by SFN values for which SFN mod m=0, where m is the number of radio frames comprising the modification period. The modification period may be configured by a SIB or by RRC signaling.

In some examples, when the network changes (some of) the MCCH information, it may notify the UEs about the change in the first subframe/slot which may be used for MCCH transmission in a repetition period. Upon receiving a change notification, a UE interested to receive MBS services may acquire the new MCCH information starting from the same subframe/slot. The UE may apply the previously acquired MCCH information until the UE acquires the new MCCH information.

In an example, a system information block (SIB) may contain the information required to acquire the control information associated transmission of MBS. The information may comprise at least one of: one or more discontinuous reception (DRX) parameters for monitoring for scheduling information of the control information associated transmission of MBS, scheduling periodicity and offset for scheduling information of the control information associated transmission of MBS, modification period for modification of content of the control information associated transmission of MBS, repetition information for repetition of the control information associated transmission of MBS, etc.

In an example, an information element (IE) may provide configuration parameters indicating, for example, the list of ongoing MBS sessions transmitted via one or more bearers for each MBS session, one or more associated RNTIs (e.g., G-RNTI, other names may be used) and scheduling information. The configuration parameters may comprise at least one of: one or more timer values for discontinuous reception (DRX) (e.g., an inactivity timer or an On Duration timer), an RNTI for scrambling the scheduling and transmission of a Multicast/Broadcast traffic channel (e.g., MTCH, other names may be used), ongoing MBS session, one or more power control parameters, one or more scheduling periodicity and/or offset values for one or more MBS traffic channels, information about list of neighbor cells, etc.

Example embodiments may enable RAN functions for broadcast/multicast for UEs in RRC_CONNECTED state, RRC_IDLE state and RRC_INACTIVE state. A group scheduling mechanism may be used to allow UEs to receive Broadcast/Multicast service. In some example, Broadcast/Multicast service may be enabled to simultaneously operate with unicast reception. In some example, Broadcast/Multicast service delivery may be dynamically changed between multicast (PTM) and unicast (PTP) with service continuity for a given UE. In some examples, a coordination function may reside in the gNB-CU. In some examples, reliability of Broadcast/Multicast service may be improved by UL feedback. The level of reliability may be based on the requirements of the application/service provided. In some examples, the Broadcast/Multicast transmission area may be dynamically controlled within one gNB-DU.

A UE may monitor a set of PDCCH candidates in the configured monitoring occasions in one or more configured COntrol REsource SETs (CORESETs) according to the corresponding search space configurations. A CORESET may comprised a set of physical resource blocks (PRBs) with a time duration of 1 to 3 OFDM symbols. The resource units Resource Element Groups (REGs) and Control Channel Elements (CCEs) may be defined within a CORESET with each CCE comprising a set of REGs. Control channels may be formed by aggregation of CCE. Different code rates for the control channels may be realized by aggregating different number of CCE. Interleaved and non-interleaved CCE-to-REG mapping may be supported in a CORESET.

Figure 18:
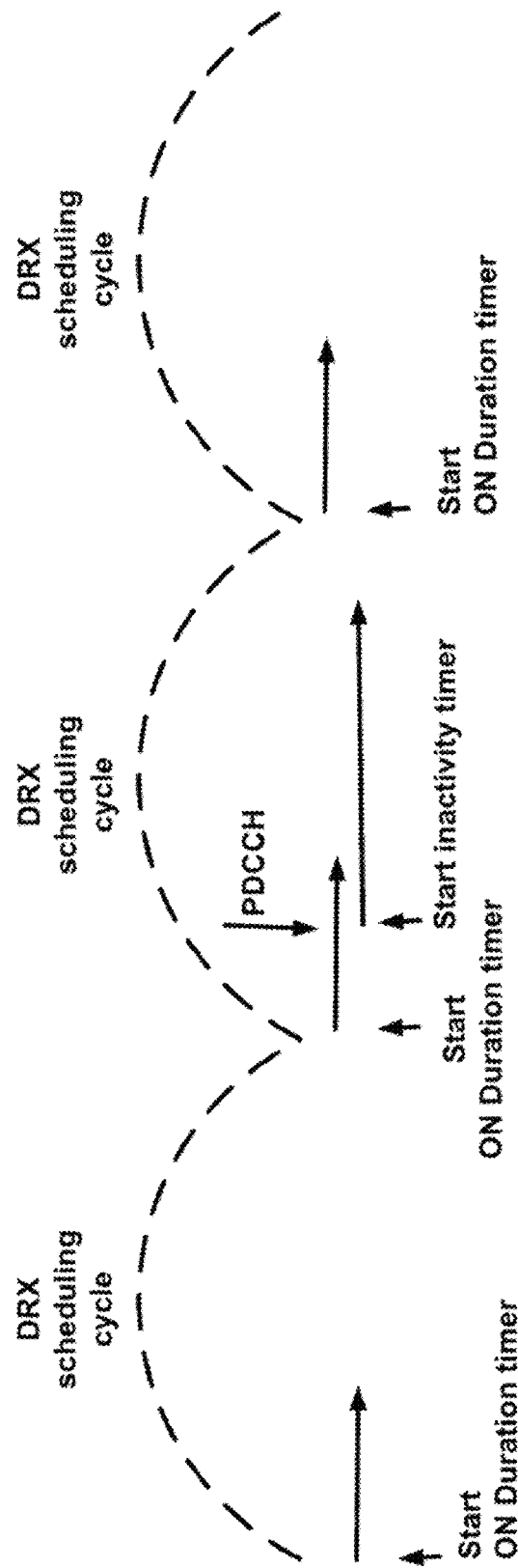
FIG. 18 shows an example MBS discontinuous reception (DRX) process according to some aspects of some of various exemplary embodiments of the present disclosure.

In some examples, for a G-RNTI (associated with MBS traffic scheduling) or a SC-RNTI (associated with MBS control scheduling), the MAC entity may be configured by RRC with a DRX functionality that controls the UE's PDCCH monitoring activity for this G-RNTI and SC-RNTI. An example of control channel monitoring using the MBS DRX procedure is shown in FIG. 18. When in RRC idle/RRC inactive or RRC connected, if DRX is configured, the MAC entity may monitor the PDCCH for this G-RNTI or SC-RNTI discontinuously using the DRX operation.

In some examples, for a G-RNTI or SC-RNTI of the MAC entity, the RRC may control its DRX operation by configuring one or more of an MBS DRX ON duration timer, an MBS DRX inactivity timer, an MBS scheduling cycle and a scheduling offset. The configuration of the MBS DRX configuration parameters may be specific for a G-RNTI/SC-RNTI or may be shared by all G-RNTIs/SC-RNTIs associated with different MBS services. In some examples, the DRX operation may be performed independently for each G-RNTI and SC-RNTI.

In some examples, when DRX is configured for a G-RNTI or for a SC-RNTI, the Active Time includes the time while an MBS DRX ON duration timer or an MBS DRX inactivity timer are running.

In some examples, when DRX is configured for a G-RNTI or for SC-RNTI, the UE may determine a plurality of occasions for receiving MBS related signaling (e.g., associated with the G-RNTI or SC-RNTI). The UE may start the MBS DRX ON duration timer for the G-RNTI or the SC-RNTI. The UE may monitor PDCCH during an Active time. If the PDCCH indicates a DL transmission, the UE may start the MBS DRX inactivity timer.

In some examples, Semi-Persistent Scheduling (SPS) may be configured by RRC per Serving Cell and per BWP. Multiple assignments may be active simultaneously in the same BWP. Activation and deactivation of the DL SPS may be independent among the Serving Cells.

In some examples, for the DL SPS, a DL assignment may be provided by PDCCH, and stored or cleared based on L1 signaling indicating SPS activation or deactivation. In some examples, the IE SPS-Config may be used to configure downlink semi-persistent transmission. Multiple Downlink SPS configurations may be configured in one BWP of a serving cell. A parameter sps-ConfigIndex may indicate the index of one of multiple SPS configurations. RRC may configure one or more of the following parameters when the SPS is configured: an RNTI for activation, deactivation, and retransmission; the number of configured HARQ processes for SPS; Offset of HARQ process for SPS; periodicity of configured downlink assignment for SPS.

In some examples, after a downlink assignment is configured for SPS, the MAC entity may consider sequentially that the Nth downlink assignment occurs in the slot for which: (numberOfSlotsPerFrame×SFN+slot number in the frame)=[(numberOfSlotsPerFrame×SFNstart time+slotstart time)+N×periodicity×numberOfSlotsPerFrame/10] modulo (1024×numberOfSlotsPerFrame)
where SFNstart time and slotstart time may be the SFN and slot, respectively, of the first transmission of PDSCH where the configured downlink assignment was (re-)initialized.

In some examples, for MBS group scheduling, group-common PDCCH or UE-specific PDCCH may be used. The group common PDCCH scheduling may enable high efficiency or low PDCCH overhead and may enable scheduling MBS for UEs in RRC_IDLE/RRC_INACTIVE states and keeping commonality between RRC_CONNECTED UEs.

In some examples, to enable the reception of MBS by UEs in RRC_CONNECTED states, the configurations transmitted to the UE may be based on the service(s) that UE is interested in. In some examples, for UEs in RRC idle or RRC inactive states, the network may transmit configurations to the UEs using a broadcasting message (e.g., using SIB) or dedicated RRC message. In some examples, the configurations may be used also for RRC connected UEs. In some examples, additional parameters may be configured for an RRC connected UE, such as the HARQ feedback related configurations. When transitioning from RRC idle/RRC inactive states to RRC connected state, the UE may switch from initial BWP to a dedicated BWP for unicast. In some examples, the frequency resources configured for receiving MBS may be different for UEs in RRC idle/RRC inactive and RRC connected states.

In some examples, UEs in an RRC connected state may be configured up to a first number of dedicated BWPs for unicast and the BWPs may be different for different UEs.

In some examples, a common BWP may be configured which may also be the active BWP if only one common BWP is configured to a group of UEs for transmitting MBS independent of the dedicated BWPs configured for unicast.

In some examples, the BWP for MBS may be or may not be overlapped with the dedicated BWP for unicast. In some examples, for UEs with a dedicated BWP which is non-overlapped with MBS BWP, the UE may support two active BWPs for simultaneous operation with unicast reception. If UE does not support two active BWPs, the UE may switch BWPs back and forth for receiving MBS or unicast. In some examples, the network may configure identical dedicated unicast BWPs for UEs in a group which may also be the BWP for scheduling MBS. In some examples, the network may configure a common sub-band for scheduling MBS within a dedicated unicast BWP.

In some examples, when a common sub-band for MBS is configured within dedicated unicast BWPs of UEs of the group and a group common PDCCH is used for scheduling a common PDSCH, the CORESET and search space for UEs' monitoring may be configured within the sub-band. The search space for scheduling MBS may be a CSS and the UEs may determine the same DCI scheduling the PDSCH, and the configuration of the search space may be the same for UEs within the group. For a common sub-band for MBS configured within dedicated unicast BWP and a group-common PDCCH based scheduling: the CORESET and search space may be configured within the common sub-band; and the configurations for the CORESET and search space may keep the same for UEs of the group.

In some examples, three DCI formats including DCI formats 1_0, 1_1 and 1_2 may be used for scheduling unicast and/or MBS PDSCH. In some examples, for a common sub-band for MBS configured within dedicated unicast BWP and a group-common PDCCH based scheduling, the frequency domain resource allocation (FDRA) field in DCI is dimensioned per the common sub-band.

To enable the reception of MBS service by UEs in RRC IDLE/RRC INACTIVE states, the configuration of the MBS service(s) that the UE is interested in may be transmitted to UE. The network may transmit information to the UEs by a broadcasting message (e.g., SIB and/or MCCH) or a dedicated RRC message. In some examples, the broadcast (e.g., SIB and/or MCCH) based mechanism may be used to enable the MBS configuration for UEs in RRC_IDLE/RRC_INACTIVE states. In some examples, the frequency resource, e.g., multicast BWP, may be configured for multicast reception, e.g., via SIB or MCCH. If not, the default may be the initial BWP. Control resource set (CORESET) and related common search space (CSS) set for multicast scheduling may be configured jointly or separately for MCCH and MTCH. If not, the default may be CORESET0 and Type0 CSS set. In some examples, RNTIs such as G-RNTI, MCCH-RNTI and MCCH-N-RNTI may be used for scheduling MTCH, MCCH and MCCH change notification, respectively. In some examples, explicit bit(s) may be added in DCI scrambled by MCCH-RNTI to indicate MCCH change notification. Considering multicast services with diverse requirements, multiple G-RNTIs and MCCH-RNTIs may be introduced. In some examples, beam sweeping mechanism may be used for the broadcast-based transmissions for multicast, e.g., MCCH/MTCH and the related scheduling DCI(s). In some examples, HARQ feedback may be used to enhance transmission efficiency and reliability for multicast.

In some examples, for a UE in idle/inactive state, a common HARQ feedback mechanism may be used. In some examples, for broadcast (SIB and/or MCCH) based mechanism, the frequency resource of MBS for a UE in RRC idle/inactive state may be the initial BWP or configured via SIB or MCCH.

In some examples, a Group Radio Network Identifier (G-RNTI) may be used and a Multicast/Broadcast Traffic Channel (e.g., MTCH or MBTCH) may be mapped to the PDSCH scrambled by G-RNTI for a group of UEs. The use of the G-RNTI may enable a dynamic, flexible, and scalable scheduling and multiplexing between unicast and multicast data within the PDSCH channel. A single PDCCH with CRC scrambled by G-RNTI may be used to indicate the PDSCH associated with the same G-RNTI for a group of UEs. Compared with per-UE PDCCH with C-RNTI, PDCCH with G-RNTI may reduce the PDCCH overhead. A UE may monitor PDCCH with CRC scrambled by G-RNTI, which may schedule PDSCH scrambled by G-RNTI.

In some examples, Multicast and Broadcast Service (MBS) services may be provided using a point to multi-point (PTM), e.g., a single cell point to multi-point (SC-PTM) framework. The SC-PTM framework may also be used for one or more of Mission Critical Push-to-Talk (MCPTT), Internet of Things (IoT), and Vehicle-to-everything (V2X) communications. In some examples of a single cell point to multi-point framework, a gNB may use the physical downlink shared channel (PDSCH) to send broadcast data and control information to a group of UEs via one or more cells. In some examples, data of an MBS service may be sent on the PDSCH using a first RNTI, e.g., a group-specific Radio Network Temporary Identifier (e.g., a G-RNTI), and the control information associated with the MBS service may be sent on the PDSCH using a second RNTI, e.g., a single cell point to multi-point radio network temporary identifier (e.g., a SC-RNTI).

Figure 17:
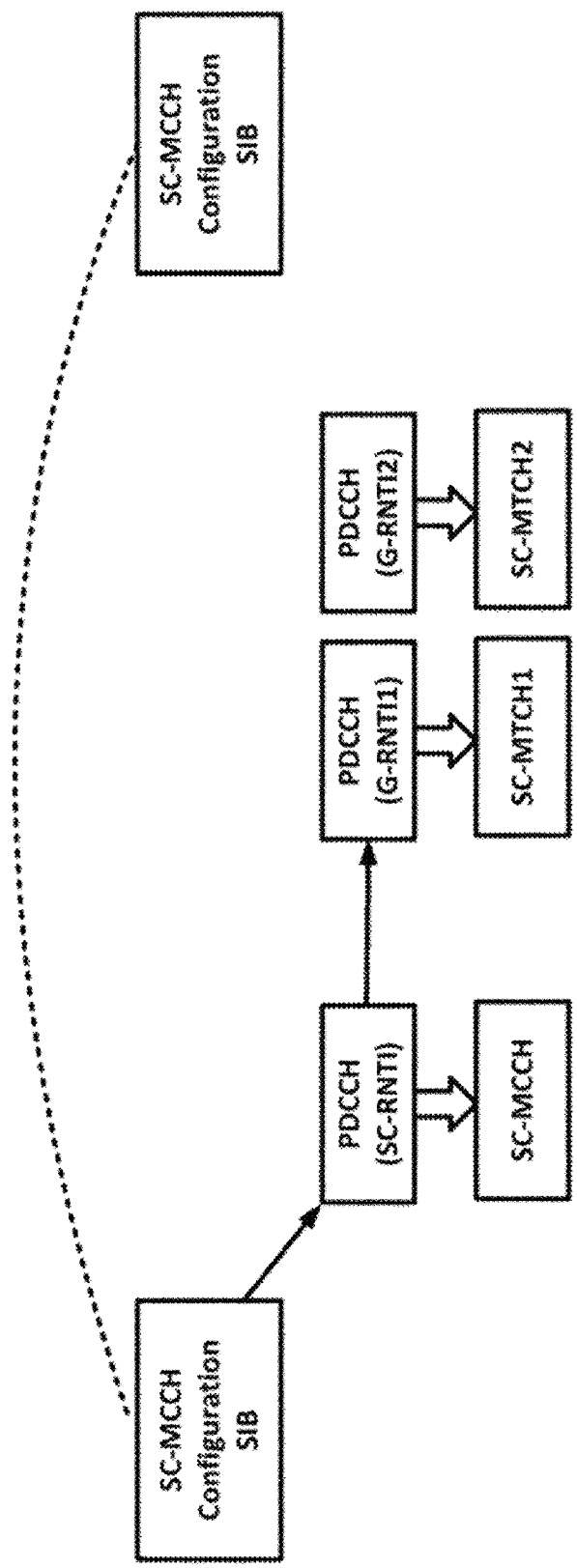
FIG. 17 shows an example MBS control signaling and traffic channel transmission according to some aspects of some of various exemplary embodiments of the present disclosure.

In some examples as shown in FIG. 17, to receive single cell point to multi-point transmissions, a UE may receive one or more of: MBS broadcast control information, for example received using a broadcast channel (e.g., a system information block (SIB)), a multicast control channel (e.g., a single cell multicast control channel (SC-MCCH)), and a multicast traffic channel (e.g., a single cell multicast traffic channel (SC-MTCH)). For example, the MBS broadcast control information (e.g., transmitted via a SIB) may indicate how to receive the multicast control channel (e.g., the SC-MCCH) that carries MBS related control information. The multicast control channel may indicate available MBS service identifiers (e.g., Temporary Mobile Group Identities (TMGIs)) and how to receive the multicast traffic channel (e.g., SC-MTCH). The multicast control channel may further indicate PAN identifiers (such as group radio network temporary identifiers (G-RNTIs)) associated with the MBS service identifiers (e.g., TMGIs). For example, the multicast control channel may indicate mappings between the TMGIs and the G-RNTIs. The information carried by the multicast control channel may remain unchanged within a modification period and may change based on the modification period. The multicast control channel information may be repeated, within a modification period, based on a repetition period.

The MBS broadcast control information may indicate the modification period and/or the repetition period. The multicast traffic channel may be used to transfer data of an MBS service. The Multicast control channel (e.g., SC-MCCH) may carry a message (e.g., a SCPTM Configuration message) comprising configuration parameters for receiving the MBS data via the MBS traffic channel. The configuration parameters may indicate ongoing MBS sessions and information on which each session may be scheduled. The configuration parameters may include a neighbor cell list for potential neighbors providing a same Temporary Mobile Group Identity (TMGI). The configuration parameters may further comprise discontinuous reception (DRX) configuration parameters related to MBS, for example, one or more of a DRX scheduling cycle for MBS, a DRX inactivity timer for MBS, a DRX ON duration timer for MBS, etc. The UE may determine occasions for receiving scheduling information for receiving the MBS data (e.g., via the MBS traffic channel) based on the DRX configuration parameters received via the multicast control channel.

In some examples, a UE may initially discover and subscribe to MBS services through application layer signaling or by other means e.g. pre-provisioning in the device. Such service discovery signaling/provisioning may provide the UE with some service identifiers for the subscribed MBS services. In some examples, a service identifier may be a Temporary Mobile Group Identity (TMGI).

In some examples, the MBS design may allow spectrum and power efficient delivery of data for a variety of use cases, including multimedia broadcasting and multicasting of contents such as videos, public safely group communications, V2X and also some Internet of Things (IoT) applications. With such diverse set of applications, multiple concurrent MBS services with different traffic patterns, bandwidths, and latency and reliability requirements may be provided to a UE or by the PAN to a plurality of UEs. The 5G PAN may deliver a variety of MBS use cases, which may require a mix of different and concurrent MBS control and data channel (e.g., MCCH/MTCH) configurations in terms of PHY numerologies, Bandwidth Parts (BWPs), periodicities and QoS requirements including but not limited to range and reliability.

In some examples, the UEs receiving an MBS service may be in an RRC connected state, RRC idle state or RRC inactive state and may have different active or default Bandwidth parts. In some examples, the UEs receiving MBS data, may use different active/default BWPs for their respective unicast services.

In some examples, the MBS configuration signaling may direct the UEs to track and process MBS information that are relevant to their target services. In some examples, MTCH may be scheduled on a plurality of cells and/or a plurality of BWPs of a cell. For examples, different MBS services may require different latency requirements and be provided on different bandwidth associated with different numerologies (e.g., symbol durations). A UE may receive multiple concurrent MBS services associated with different PHY numerologies. In some example, a UE may use HARQ and may be scheduled for HARQ retransmissions for an MBS service. In some examples, the configuration of HARQ may be MBS service specific or UE specific. In some example (e.g., for MBS services with latency requirements), a UE may be configured with a non-slot-based allocation for an MBS service.

In some examples, a UE may be scheduled and may transmit multiple multicast traffic channels on different BWPs with different numerologies. For example, the RAN may configure one MCCH in one BWP/CORESET, which may allocate MTCH resources on the same or different or alternative BWPs. For example, the PAN may configure one MCCH for each BWP/CORESET that may carry MTCH data and MCCH may allocate MTCH in the same BWP.

In some examples, an MBS service or UE may be configured with confirmation/acknowledgement of delivery (e.g., HARQ Acknowledgements). In some examples, different MBS services may have different levels of HARQ/retransmission requirements/configurations. For example, PDCP or upper layer retransmission may be used for an MBS service for a UE or for UEs in an area. In some examples, MTCH transmissions associated with an MBS service may be configured with or without HARQ. In some examples, support for HARQ based MTCH transmissions may be configurable for an MBS service.

In some examples, the MBS data for different use cases may have different QoS requirements and traffic patterns. For example, some MBS data may be periodic or aperiodic and some may have low latency requirements. Example embodiments may enable efficient resource allocation for periodic and aperiodic MBS data and low latency. In some examples, MBS resource allocation may enable efficient delivery of periodic and aperiodic data on MTCH reusing features used for unicast scheduling. In some example, MTCH scheduling may enable non-slot-based MBS, e.g. may enable multicasting for mMTC and ultra-reliable low-latency applications. In some example, MTCH scheduling may be used for UEs in idle and inactive states to receive the data without returning to a connected state.

In some examples, resource allocation information for MTCHs may be carried by an MCCH and UEs in all RRC states may obtain the MCCHs configuration information and their updates.

Figure 19:
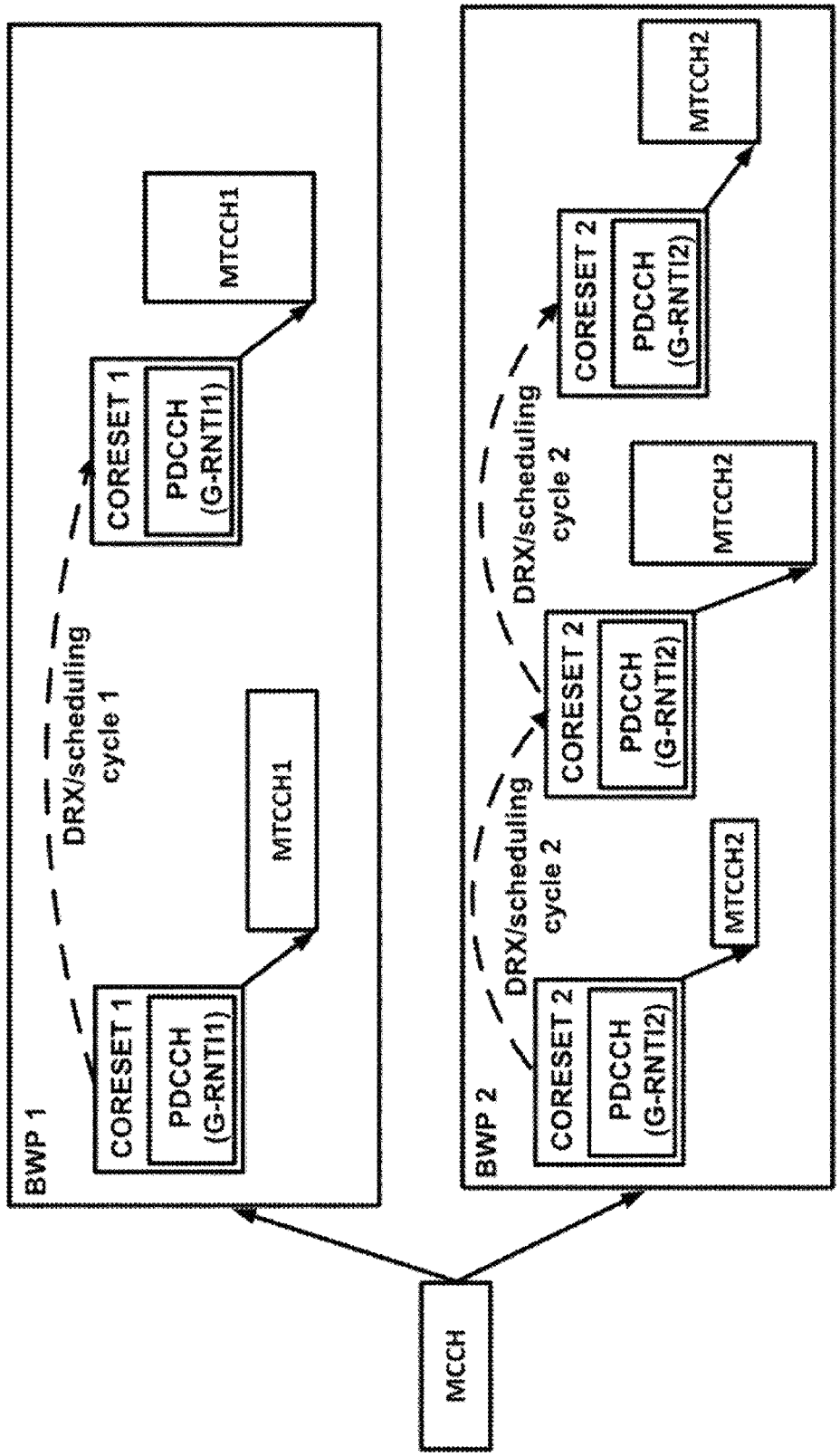
FIG. 19 shows an example process according to some aspects of some of various exemplary embodiments of the present disclosure.

In some examples, a DRX procedure may be used for MTCH scheduling. The multicast control channel may indicate TMGI to G-RNTI mapping and the DRX configuration parameters for MBS. The DRX configuration parameters for MBS may be MBS service/TMGI/G-RNTI specific or may be shared by all MBS services/TMGIs/G-RNTIs. The DRX configuration parameters for MBS may include one or more of a DRX scheduling cycle; an MBS DRX ON duration (e.g., a duration that the UE waits for, after waking up from DRX, to receive PDCCHs); and an MBS DRX inactivity-timer. If the UE successfully decodes a PDCCH indicating the DL-SCH to which this multicast traffic channel is mapped, the UE may stay awake and starts the MBS inactivity-timer. This information may point to occasions where MTCH may be received and not the actual PDSCH resource. In some examples, the UE may be configured with a DRX cycle for PDCCH monitoring and multicast traffic channel reception, where PDCCH may use G-RNTI for an MTCH scheduled in the same subframe. An example is shown in FIG. 19.

In some examples, data transmissions may be on different BWPs and PDCCHs may be monitored in different CORESETs (e.g., a CORESET in the same BWP that the MBS data is scheduled or a CORESET in a different BWP that the MBS data is scheduled). In some examples, the configuration parameters carried by the multicast control channel (e.g., SC-MCCH) may indicate a BWP/CORESET where PDCCH for a given TMGI/G-RNTI may be received. In some examples, the BWP used to receive MCCH may be the same BWP carrying PDCCH scheduling MTCH (e.g., associated with G-RNTI) and/or the same BWP that the corresponding MTCH is received. In some examples, the BWP used to receive MCCH may be the different from the BWP carrying PDCCH scheduling the MTCH (e.g., PDCCH with CRC scrambled by G-RNTI) and/or different from the BWP that the corresponding MTCH is received. In some example, a UE may be configured with one or more BWPs for MBS and the configured parameters may indicate the cell/BWP, CORESET and/or Common Search Space (CSS) for PDCCH carrying scheduling information for a given G-RNTI.

In some examples, a downlink scheduling DCI format (e.g., DCI Format 1_0 or DCI format 1_1) with CRC scrambled by a G-RNTI may be used for scheduling MTCH to enable full flexibility of time and frequency scheduling used in unicast services. In some examples, a BWP identifier field in a DCI format may be used to enable MTCH scheduling on a different BWP from the BWP that a PDCCH is received.

Figure 20:
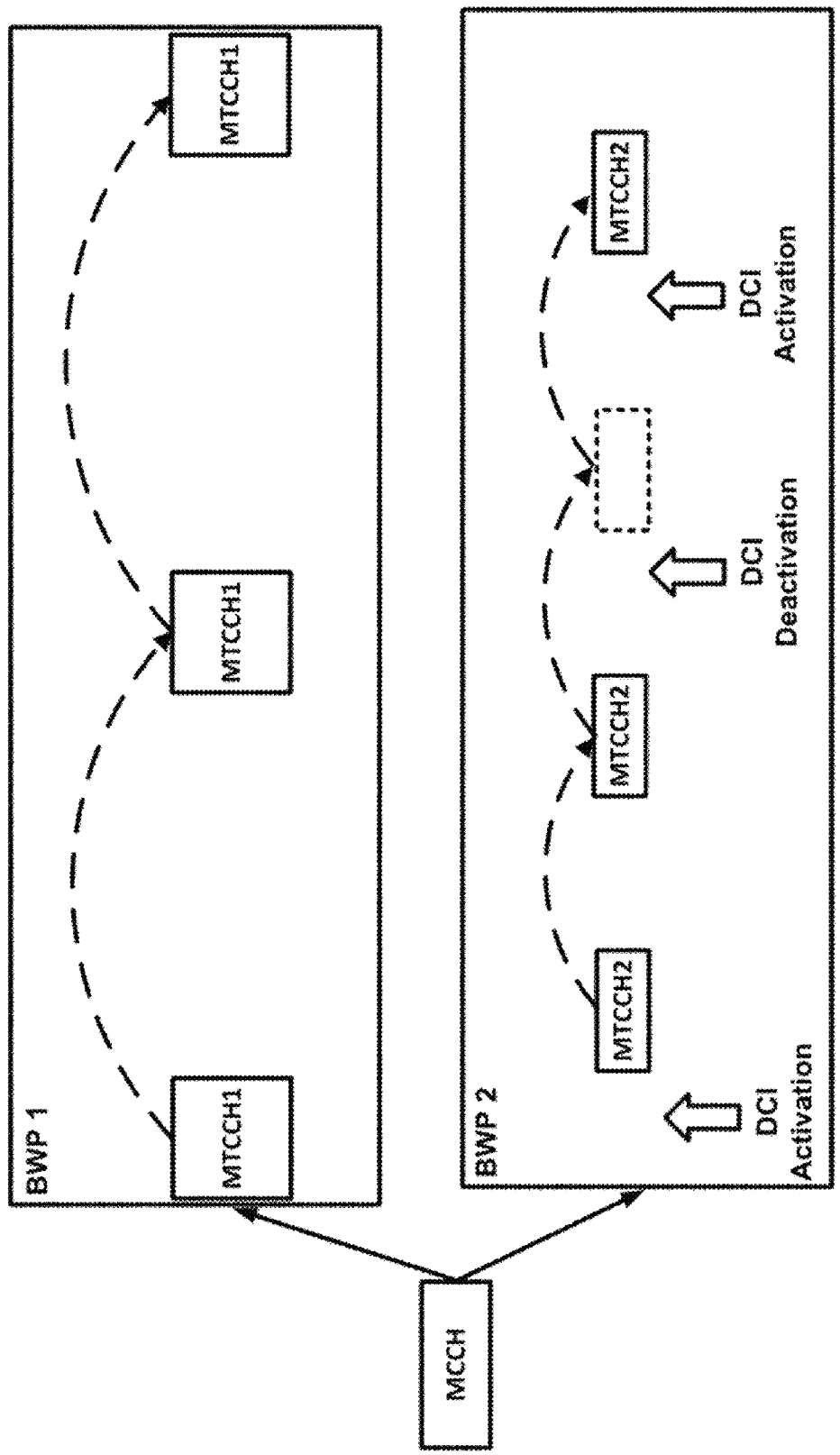
FIG. 20 shows an example process according to some aspects of some of various exemplary embodiments of the present disclosure.

In some examples, Semi-Persistent Scheduling (SPS) may be used for multicast traffic channel (MTCH) scheduling and for receiving MBS data associated with one or more MBS services. For some MBS services where data transmission has periodic patterns, a Semi-Persistent Scheduling (SPS) configuration with appropriate periodicity may be configured. In some examples as shown in FIG. 20, multiple active SPS configurations in DL (e.g., for different cells or the same cell/BWP) may be configured for MBS. With configuration of SPS for MTCH scheduling, instead of DRX configuration and dynamic scheduling, signaling overhead and processing needed by UEs, including UEs in idle and inactive states, for monitoring and access of MBS data may be reduced. Instead of configuring DRX for monitoring and scheduling each MTCH transmission with a PDCCH, the time and frequency resources may be configured by an RRC message in MCCH. In some example, DCI signaling may be used to activate or deactivate the SPS. In some examples, SPS configuration in MCCH may include information about cell/BWP, radio resources (e.g., RBs), periodicity/cycle, and timing e.g. frame, subframe and/or symbol offsets and durations of MTCH transmission for a TMGI mapped to a G-RNTI.

In some example, a PDCCH with CRC scrambled by the corresponding G-RNTI may be used by a base station to indicate to the UEs about SPS activation/deactivation or changes in MBS transmissions parameters for a TMGI (e.g., a TMGI associated with the G-RNTI). In some examples, the UEs may obtain the SPS configuration of resources used for multicast traffic channel (e.g., MTCH) transmissions as part of MBS configuration parameters received based on the multicast control channel. In some examples, the SPS configuration information may be independently configured for MTCHs corresponding to a TMGI/G-RNTI. In some examples, the SPS configuration information may include flexible frequency and time resource information such as Carrier/BWP, radio resources (e.g., RBs) and timing, e.g. frame, subframe and/or symbol offsets and durations, of those MTCH transmissions.

In some examples, a mix of DRX based scheduling and SPS based scheduling may be used. The multicast control channel (e.g., MCCH) may indicate DRX based scheduling for one or more first MBS services (e.g., one or more first TMGIs and their associated G-RNTIs) and may indicate SPS based scheduling for one or more second MBS services (e.g., one or more second TMGIs and their associated G-RNTIs). The one or more first MBS services may have different traffic patterns and/or QoS requirements from the one or more second MBS services.

In some examples, the UEs in RRC Idle and RRC Inactive states may access the MCCH information and receive MBS data on MTCH without returning to RRC Connected states. In some examples, a UE registered with an MBS service may monitor the multicast control channel (e.g., MCCH) and follow scheduling information and process the multicast traffic channel (e.g., MTCH) transmission for their target services without leaving their RRC states.

Figure 21:
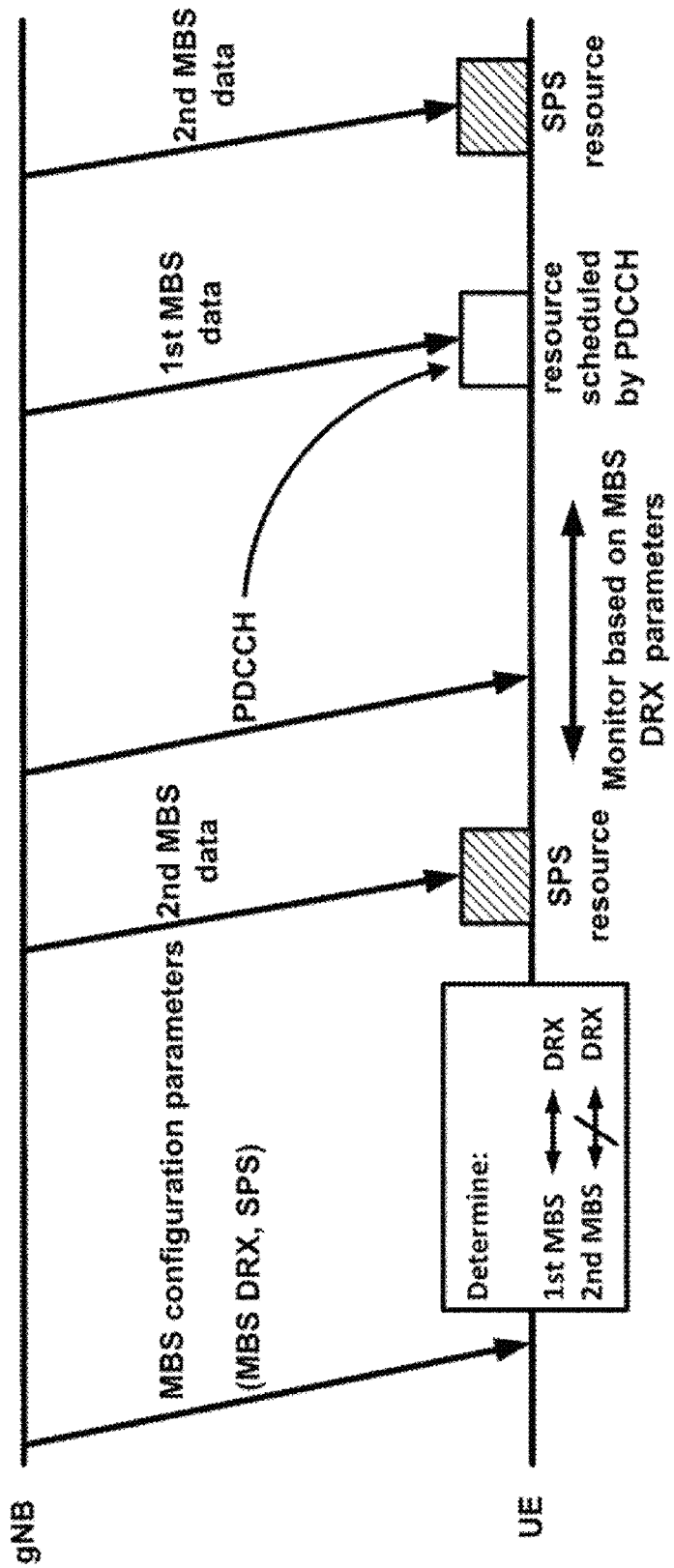
FIG. 21 shows an example process according to some aspects of some of various exemplary embodiments of the present disclosure.

In an example embodiment as shown in FIG. 21, a UE may receive one or more messages comprising MBS configuration parameters. In an example, the UE may receive the one or more messages via a physical downlink shared channel (PDSCH). In an example, a logical channel carrying the MBS configuration parameters may be a multicast control channel (e.g., MCCH, e.g., SC-MCCH) and the multicast control channel may be mapped to the PDSCH physical channel. In an example, the configuration parameters may be included one or more RRC information elements carried by the multicast control channel. The configuration parameters may comprise DRX configuration parameters for one or more MBS services. The DRX configuration parameters may be specific to the one or more MBS services and my not be shared by unicast services or may not be shared by other MBS services. For example, the DRX configuration parameters may be configured for one or more RNTIs (e.g., RNTI(s) used for receiving control or data scheduling information such as G-RNTI(s) or SC-RNTI(s), etc.) associated with the one or more MBS services.

The DRX configuration parameters comprise at least one of a scheduling cycle, a scheduling offset, an on duration timer value, and an inactivity timer value, which may be selected individually or in combination. The UE may determine a plurality of occasions based on the DRX configuration parameters (e.g., the scheduling offset and the scheduling cycle). The UE may start a DRX ON duration timer at the determined plurality of timings. The UE may be in DRX Active time while the DRX ON duration timer running and may monitor a control while in DRX Active time. The UE may receive scheduling information for the second multicast broadcast service based on the monitoring and may start an inactivity timer based on the scheduling information indicating radio resources for reception of a downlink TB. The UE may be in a DRX Active time and may monitor a control channel while the inactivity timer is running.

The configuration parameters may further include semi-persistent scheduling (SPS) configuration parameters. The SPS configuration parameters may be used for receiving MBS traffic channels associated with one or more second MBS services and/or for receiving scheduling information for the MBS traffic channels associated with the one or more second MBS services. The SPS configuration parameters may comprise configuration parameters for a plurality of SPS configurations for a plurality of MBS services.

In an example, the multicast broadcast configuration parameters may further comprise information about the BWP and/or CORESET used for reception of a multicast broadcast data or for receiving the scheduling information for the reception of the multicast broadcast data. In an example, the BWP or CORESET used for reception of the scheduling information of the multicast broadcast data may be the same BWP that the multicast broadcast data is received or may be different from the BWP that the multicast broadcast data is received.

In an example, the SPS configuration may comprise first configuration parameters of one or more SPS configurations comprising a first SPS configuration. The one or more SPS configurations may be configured on one or more cells/BWPs or one or more BWPs of the same cell. The first SPS configuration may be associated with the second multicast broadcast service. In some examples, the first SPS configuration parameters may indicate sub-slot-based SPS transmission (e.g., wherein the SPS transmissions/TBs are in one or more symbols within a slot) or slot-based SPS transmission/TB. In some examples, the first SPS configuration parameters may indicate a repetition parameter indicating multiple repetitions of a SPS transmission in a SPS occasion. In some examples, an MBS service may have low-latency and high reliability requirements (e.g., such as a URLLC service). In some examples, the first SPS configuration parameters may indicate that the first SPS configuration is associated with the second MBS service. For example, a SPS configuration index may indicate that the first SPS configuration is associated with an MBS service or the second MBS service.

In some example, the UE may determine/activate radio resources for the second MBS service in response to receiving the first SPS configuration parameters and without receiving an activation signaling. In some examples, in response to receiving the first SPS configuration parameters, the UE may determine/activate a plurality of SPS resources for reception of the second multicast broadcast service data based on an offset parameter (e.g., an offset to a system frame number (SFN), e.g., SFN=0).

In some examples, the UE may determine/activate the SPS radio resources for reception of the second multicast broadcast data in response to receiving the first SPS configuration parameters and receiving an activation signaling for the first SPS configuration. The UE may determine the radio resources for associated with the first SPS configuration using the first SPS configuration parameters and parameters indicated by the activation DCI. For example, an activation DCI may comprise a field indicating the SPS configuration index for the first SPS configuration.

The multicast broadcast configuration parameters (e.g., received via the multicast control channel) may comprise first parameters of a first MBS service (e.g., a first TMGI, a first mapping of a first TMGI to a first G-RNTI, etc.) and second parameters of a second MBS service (e.g., a second TMGI, a second mapping of a second TMGI to a second G-RNTI, etc.). The UE may determine that the first MBS service is associated with the DRX configuration parameters. The UE may also determine that the second MBS service is not associated with the DRX configuration. For example, the first parameters may comprise a first parameter indicating that the first MBS service is associated with the DRX configuration parameters and the second parameters may comprise a second parameter indicating that the second MBS service is not associated with the DRX configuration parameters. For example, the UE may determine that the first MBS service is associated with the DRX configuration parameters based on the first parameters comprising the DRX configuration parameters. The UE may determine that the second MBS service is not associated with the DRX configuration parameters based on the second parameters not comprising the DRX configuration parameters.

The UE may receive first multicast broadcast data, associated with the first multicast broadcast service, by receiving scheduling information, via downlink control signaling, indicating radio resources for reception of the first multicast broadcast data. The UE may receive the downlink control signaling via a physical downlink control channel (PDCCH). The UE may monitor the PDCCH while in a DRX Active time, wherein the determining the DRX Active time may be based on an MBS DRX procedure and using the DRX configuration parameters. The UE may use the DRX procedure and the DRX configuration in response to determining that the first multicast broadcast service is associated with the DRX configuration parameters. The monitoring the control channel may be for an RNTI associated with the first multicast broadcast service (e.g., the G-RNTI associated with the first multicast broadcast service).

The UE may receive second multicast broadcast data, associated with the second multicast broadcast service, based on the SPS configuration parameters. The UE may receive the second multicast broadcast data based on the SPS configuration parameters without monitoring the control channel (e.g., monitoring the control channel using the DRX configuration parameters) for scheduling information of the second multicast broadcast data. The UE may use the SPS configuration parameters for receiving the second multicast broadcast data in response to determining that the first multicast broadcast service is associated with the DRX configuration parameters and based on the second parameters of the configuration parameters, associated with the second multicast broadcast data, comprising the SPS configuration parameters.

In some examples, the multicast broadcast configuration parameters (e.g., a PDSCH mapped to a multicast control channel carrying the multicast broadcast configuration parameters) may be received in a first BWP/cell and the first multicast broadcast data or the second multicast broadcast data are scheduled for reception in a second BWP/cell different from the first BWP. In some examples, the multicast broadcast configuration parameters and the first multicast broadcast data or the second multicast broadcast data are scheduled for reception in the same or common cell or BWP of the common cell.

In some examples, the UE may receive control information (e.g., via a broadcast message, e.g., a SIB) indicating scheduling information for reception of the multicast broadcast control channel carrying the multicast broadcast configuration parameters. In some example, the UE may be in an RRC connected state or an RRC inactive/idle state and the UE may receive the scheduling information for the multicast broadcast control channel in either the RRC connected state or the RRC inactive/idle state.

In an embodiment, a user equipment (UE) may receive multicast broadcast configuration parameters comprising: discontinuous reception (DRX) configuration parameters associated with one or more multicast broadcast services; and semi-persistent scheduling (SPS) configuration parameters. The UE may determine, based on the multicast broadcast configuration parameters, that: a first multicast broadcast service is associated with the DRX configuration parameters; and a second multicast broadcast service is not associated with the DRX configuration parameters. The UE may receive first multicast broadcast data, associated with the first multicast broadcast service, based on scheduling information determined by monitoring a control channel using the DRX configuration parameters. The UE may receive second multicast broadcast data, associated with the second multicast broadcast service, based on the SPS configuration parameters and without monitoring the control channel for the scheduling information.

In some embodiments, the semi-persistent scheduling (SPS) configuration parameters may comprise first configuration parameters of a first SPS configuration associated with the second multicast broadcast service. In some embodiments, the semi-persistent scheduling (SPS) configuration parameters may be for one or more SPS configurations comprising the first configuration. In some embodiments, the one or more SPS configurations may be for a same cell or a same bandwidth part (BWP) of the same cell. In some embodiments, the first configuration parameters may indicate sub-slot-based transmission for the second multicast broadcast data. In some embodiments, the first configuration parameters may indicate repetition of a multicast broadcast transport block for a plurality of times in a semi-persistent scheduling (SPS) occasion.

In some embodiments, the first configuration parameters may comprise at least one parameter indicating that the first SPS configuration is associated with the second multicast broadcast service. In some embodiments, the receiving the second multicast broadcast data may be based on receiving a downlink control information indicating activation of the first SPS configuration. In some embodiments, the UE may determine radio resources of the second multicast broadcast data based on the downlink control information and the first configuration parameters. In some embodiments, the receiving the second multicast broadcast data may be based on receiving the first configuration parameters and without receiving an activation downlink control information for the first semi-persistent scheduling (SPS) configuration. In some embodiments, the first configuration parameters may comprise an offset parameter and a periodicity parameter. The receipt of the second multicast data includes receiving based on the offset parameter and the periodicity parameter. In some embodiments, the offset parameter may be an offset to a system frame number with a first value.

In some embodiments, the multicast broadcast configuration parameters may comprise a first parameter and a second parameter; and the determining may be based on the first parameter and the second parameter.

In some embodiments, the receiving the multicast broadcast configuration parameter may be via a multicast control channel. In some embodiments, the multicast control channel may be configured on a first bandwidth part (BWP); and the first multicast broadcast service or the second multicast broadcast service may be configured for reception in a second BWP. In some embodiments, the multicast control channel may be configured on a bandwidth part (BWP); and the first multicast broadcast service and the second multicast broadcast service may be configured for reception in the same BWP.

In some embodiments, the UE may receive one or more messages comprising scheduling information for receiving the multicast control channel. In some embodiments, the one or more messages may comprise a broadcast message. In some embodiments, the broadcast message may be a system information block.

In some embodiments, the UE may be in a radio resource control (RRC) idle or RRC inactive state.

In some embodiments, the first multicast broadcast service may be associated with a first service identifier; and the second multicast broadcast service may be associated with a second service identifier. In some embodiments, the first service identifier may be associated with a first radio network temporary identifier; and the second service identifier may be associated with a second radio network temporary identifier. In some embodiments, the monitoring the control channel may be for the first radio network identifier.

In some embodiments, the multicast broadcast configuration parameters may further comprise bandwidth part (BWP) or control resource set (CORESET) identifiers of one or more BWPs or CORESETs for reception of the first multicast broadcast service or the second multicast broadcast service.

In some embodiments, the DRX configuration parameters may comprise at least one of a scheduling cycle, a scheduling offset, an on duration timer value and an inactivity timer value. In some embodiments, the UE may determine a plurality of timings based on the scheduling cycle and the scheduling offset; the UE may start, at the determined plurality of timings, an on duration timer with the on duration timer value; the UE may monitor the control channel while the on duration timer is running; the UE may receive scheduling information for the second multicast broadcast data based on the monitoring; the UE may start an inactivity timer, with the inactivity timer value, based on scheduling information indicating radio resources for a downlink transport block; and the UE may monitor the control channel while the inactivity timer is running.

In some embodiments, receiving the second multicast broadcast data may be without monitoring the control channel using the DRX configuration parameters.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of enhancing a scheduling process for multicast broadcast services (MBS), comprising:
receiving, by a user equipment (UE), multicast broadcast configuration parameters, comprising:
discontinuous reception (DRX) configuration parameters associated with one or more of the MBS; and semi-persistent scheduling (SPS) configuration parameters;
determining, by the UE, a first multicast broadcast service is associated with the DRX configuration parameters;
determining, by the UE, a second multicast broadcast service is not associated with the DRX configuration parameters
receiving, by the UE, first multicast broadcast data, associated with the first multicast broadcast service, based on scheduling information determined by monitoring a control channel using the DRX configuration parameters; and receiving, by the UE, second multicast broadcast data, associated with the second multicast broadcast service, based on the SPS configuration parameters and without monitoring the control channel for the scheduling information.
Clause 2. The method of Clause 1, wherein the SPS configuration parameters comprise first configuration parameters of a first SPS configuration associated with the second multicast broadcast service.
Clause 3. The method of Clause 2, wherein the SPS configuration parameters corresponding to one or more SPS configurations comprising the first configuration.
Clause 4. The method of Clause 3, wherein the one or more SPS configurations correspond to a common cell.
Clause 5. The method of Clause 4, wherein the one or more SPS configurations correspond to a same bandwidth part (BWP) of the same cell.
Clause 6. The method of Clause 3, wherein the first configuration parameters indicate sub-slot-based transmission for the second multicast broadcast data.
Clause 7. The method of Clause 3, wherein the first configuration parameters indicate repetition of a multicast broadcast transport block for a plurality of times in a SPS occasion.
Clause 8. The method of Clause 2, wherein the first configuration parameters comprise at least one parameter indicating that the first SPS configuration is associated with the second multicast broadcast service.
Clause 9. The method of Clause 2, wherein receiving the second multicast broadcast data is based on receiving a downlink control information indicating activation of the first SPS configuration.
Clause 10. The method of Clause 9 further comprising determining radio resources of the second multicast broadcast data based on the downlink control information and the first configuration parameters.
Clause 11. The method of Clause 2, wherein receiving the second multicast broadcast data includes receiving the first configuration parameters without receiving an activation downlink control information for the first semi-persistent scheduling (SPS) configuration.
Clause 12. The method of Clause 2, wherein the first configuration parameters comprise an offset parameter and a periodicity parameter, and wherein receiving, by the UE, second multicast broadcast data includes receiving the second multicast broadcast data based on the offset parameter and the periodicity parameter.
Clause 13. The method of Clause 12, wherein the offset parameter is an offset to a system frame number with a first value.
Clause 14. The method of Clause 1, wherein:
the multicast broadcast configuration parameters comprise a first parameter and a second parameter; and
the determining is based on the first parameter and the second parameter.
Clause 15. The method of Clause 1, wherein the multicast broadcast configuration parameter is received via a multicast control channel.
Clause 16. The method of Clause 14, wherein:
the multicast control channel is configured on a first BWP; and
the first multicast broadcast service or the second multicast broadcast service is configured for reception in a second BWP.
Clause 17. The method of Clause 15, wherein:
the multicast control channel is configured on a BWP; and
the first multicast broadcast service and the second multicast broadcast service are configured for reception in the BWP.
Clause 18. The method of Clause 15, further comprising receiving one or more messages including scheduling information for receiving the multicast control channel.
Clause 19. The method of Clause 18, wherein the one or more messages comprise a broadcast message.
Clause 20. The method of Clause 19, wherein the broadcast message is a system information block.
Clause 21. The method of Clause 1, wherein the user equipment (UE) is in a radio resource control (RRC) idle or RRC inactive state.

Clause 22. The method of Clause 1, wherein:
the first multicast broadcast service is associated with a first service identifier; and
the second multicast broadcast service is associated with a second service identifier.

Clause 23. The method of Clause 22, wherein:
the first service identifier is associated with a first radio network temporary identifier; and
the second service identifier is associated with a second radio network temporary identifier.

Clause 24. The method of Clause 23, wherein monitoring the control channel is for the first radio network identifier.

Clause 25. The method of Clause 1, wherein the multicast broadcast configuration parameters further comprise BWP identifiers or control resource set (CORESET) identifiers of one or more BWPs or CORESETs for reception of the first multicast broadcast service or the second multicast broadcast service.

Clause 26. The method of Clause 1, wherein the DRX configuration parameters comprise at least one of a scheduling cycle, a scheduling offset, an on duration timer value and an inactivity timer value.

Clause 27. The method of Clause 26 further comprising:
determining a plurality of timings based on the scheduling cycle and the scheduling offset;
starting, at the determined plurality of timings, an on duration timer with the on duration timer value;
monitoring the control channel while the on duration timer is running;
receiving scheduling information for the second multicast broadcast data based on the monitoring;
starting an inactivity timer, with the inactivity timer value, based on the scheduling information indicating radio resources for a downlink transport block; and monitoring the control channel while the inactivity timer is running.

Clause 28. The method of Clause 1, wherein receiving the second multicast broadcast data is without monitoring the control channel using the DRX configuration parameters.

Clause 29. An apparatus for utilization in wireless communications comprising:
an antenna for use in transmission of electromagnetic signals;
a memory for maintaining computer-readable code; and a processor for executing the computer-readable code that causes the apparatus to:
receive multicast broadcast configuration parameters, comprising discontinuous reception (DRX) configuration parameters associated with one or more of the multicast broadcast services (MBS) and semi-persistent scheduling (SPS) configuration parameters;
determine a first multicast broadcast service is associated with the DRX configuration parameters;
determine a second multicast broadcast service is not associated with the DRX configuration parameters;
receive first multicast broadcast data, associated with the first multicast broadcast service, based on scheduling information determined by monitoring a control channel using the DRX configuration parameters; and
receive second multicast broadcast data, associated with the second multicast broadcast service, based on the SPS configuration parameters and without monitoring the control channel for the scheduling information.

Clause 30. The apparatus of Clause 29, wherein the SPS configuration parameters comprise first configuration parameters of a first SPS configuration associated with the second multicast broadcast service.

Clause 31. The apparatus of Clause 30, wherein the SPS configuration parameters corresponding to one or more SPS configurations comprising the first configuration.

Clause 32. The apparatus of Clause 31, wherein the one or more SPS configurations correspond to a common cell.

Clause 33. The apparatus of Clause 32, wherein the one or more SPS configurations correspond to a same bandwidth part (BWP) of the same cell.

Clause 34. The apparatus of Clause 31, wherein the first configuration parameters indicate sub-slot-based transmission for the second multicast broadcast data.

Clause 35. The apparatus of Clause 31, wherein the first configuration parameters indicate repetition of a multicast broadcast transport block for a plurality of times in a SPS occasion.

Clause 36. The apparatus of Clause 30, wherein the first configuration parameters comprise at least one parameter indicating that the first SPS configuration is associated with the second multicast broadcast service.

Clause 37. The apparatus of Clause 30, wherein receiving the second multicast broadcast data is based on receiving a downlink control information indicating activation of the first SPS configuration.

Clause 38. The apparatus of Clause 37, wherein the apparatus determines radio resources of the second multicast broadcast data based on the downlink control information and the first configuration parameters.

Clause 39. The apparatus of Clause 30, wherein receiving the second multicast broadcast data includes receiving the first configuration parameters without receiving an activation downlink control information for the first semi-persistent scheduling (SPS) configuration.

Clause 40. The apparatus of Clause 30, wherein the first configuration parameters comprise an offset parameter and a periodicity parameter, and wherein receiving, by the UE, second multicast broadcast data includes receiving the second multicast broadcast data based on the offset parameter and the periodicity parameter.

Clause 41. The apparatus of Clause 40, wherein the offset parameter is an offset to a system frame number with a first value.

Clause 42. The apparatus of Clause 29, wherein the multicast broadcast configuration parameters comprise a first parameter and a second parameter; and the apparatus determines that a first multicast broadcast service is associated with the DRX configuration parameters and that a second multicast broadcast service is not associated with the DRX configuration parameters based on the first parameter and the second parameter.

Clause 43. The apparatus of Clause 29, wherein the multicast broadcast configuration parameter is received via a multicast control channel.

Clause 44. The apparatus of Clause 43, wherein:
the multicast control channel is configured on a first BWP; and
the first multicast broadcast service or the second multicast broadcast service is configured for reception in a second BWP.

Clause 45. The apparatus of Clause 43, wherein:
the multicast control channel is configured on a BWP; and
the first multicast broadcast service and the second multicast broadcast service are configured for reception in the BWP.

Clause 46. The apparatus of Clause 43, further comprising receiving one or more messages including scheduling information for receiving the multicast control channel.

Clause 47. The apparatus of Clause 46, wherein the one or more messages comprise a broadcast message.

Clause 48. The apparatus of Clause 47, wherein the broadcast message is a system information block.

Clause 49. The apparatus of Clause 29, wherein the user equipment (UE) is in a radio resource control (RRC) idle or RRC inactive state.

Clause 50. The apparatus of Clause 29, wherein:
the first multicast broadcast service is associated with a first service identifier; and
the second multicast broadcast service is associated with a second service identifier.

Clause 51. The apparatus of Clause 50, wherein:
the first service identifier is associated with a first radio network temporary identifier; and
the second service identifier is associated with a second radio network temporary identifier.

Clause 52. The apparatus of Clause 23, wherein monitoring the control channel is for the first radio network identifier.

Clause 53. The apparatus of Clause 29, wherein the multicast broadcast configuration parameters further comprise BWP identifiers or control resource set (CORESET) identifiers of one or more BWPs or CORESETs for reception of the first multicast broadcast service or the second multicast broadcast service.

Clause 54. The apparatus of Clause 29, wherein the DRX configuration parameters comprise at least one of a scheduling cycle, a scheduling offset, an on duration timer value and an inactivity timer value.

Clause 55. The apparatus of Clause 54, wherein the apparatus:
determines a plurality of timings based on the scheduling cycle and the scheduling offset;
starts, at the determined plurality of timings, an on duration timer with the on duration timer value;
monitors the control channel while the on duration timer is running;
receives scheduling information for the second multicast broadcast data based on the monitoring;
starts an inactivity timer, with the inactivity timer value, based on the scheduling information indicating radio resources for a downlink transport block; and
monitors the control channel while the inactivity timer is running.

Clause 56. The apparatus of Clause 29, wherein receiving the second multicast broadcast data is without monitoring the control channel using the DRX configuration parameters.

This application claims the benefit of U.S. Provisional Application No. 63/084,408, entitled "ENHANCED RESOURCE ALLOCATION FOR MULTICAST BROADCAST SERVICES", and filed on Sep. 28, 2020. U.S. Provisional Application No. 63/084,408 is incorporated by reference herein.

The invention claimed is:

1. A method of enhancing a scheduling process for multicast broadcast service (MBS) services, comprising:
receiving, by a user equipment (UE), one or more configuration messages for the MBS services via a physical downlink shared channel (PDSCH), the one or more configuration messages comprising:
discontinuous reception (DRX) configuration parameters associated with a first MBS service; and
semi-persistent scheduling (SPS) configuration parameters associated with a second MBS service;
receiving, by the UE, first multicast broadcast data associated with the first MBS service based on scheduling information determined by monitoring a control channel using the DRX configuration parameters; and
receiving, by the UE, second multicast broadcast data associated with the second MBS service based on the SPS configuration parameters,
wherein the SPS configuration parameters comprise an offset parameter indicating an offset of a hybrid automatic repeat request (HARQ) process, and
wherein receiving, by the UE, second multicast broadcast data comprises receiving the second multicast broadcast data based on the offset parameter.

2. The method of claim 1, wherein receiving second multicast broadcast data associated with the second MBS service based on the SPS configuration parameters comprises determining radio resources for the second MBS service in response to receiving the SPS configuration parameters and without receiving an activation signaling for the SPS configuration parameters.

3. The method of claim 1, wherein receiving second multicast broadcast data associated with the second MBS service based on the SPS configuration parameters comprises determining radio resources for the second MBS service in response to receiving the SPS configuration parameters and receiving an activation signaling for the SPS configuration parameters.

4. The method of claim 1, wherein the SPS configuration parameters correspond to a common cell.

5. The method of claim 4, wherein the SPS configuration parameters correspond to a same bandwidth part (BWP) of the same cell.

6. The method of claim 1, wherein the SPS configuration parameters comprise at least one parameter indicating sub-slot-based transmission for the second multicast broadcast data.

7. The method of claim 1, wherein the SPS configuration parameters comprise at least one parameter indicating repetition of a multicast broadcast transport block for a plurality of times in a SPS occasion.

8. The method of claim 1, wherein the SPS configuration parameters comprise at least one parameter indicating that the SPS configuration parameters are associated with the second MBS service.

9. The method of claim 1, wherein the SPS configuration parameters comprise a periodicity parameter, and wherein receiving, by the UE, second multicast broadcast data comprises receiving the second multicast broadcast data based on the periodicity parameter.

10. The method of claim 9, wherein the SPS configuration parameters further comprise an offset parameter indicating an offset to a system frame number with a first value.

11. An apparatus for utilization in wireless communications comprising:
an antenna for use in transmission of electromagnetic signals;
a memory for maintaining computer-readable code; and
a processor for executing the computer-readable code that causes the apparatus to:
receive one or more configuration message for multicast broadcast services (MBS) services via a physical downlink shared channel (PDSCH), the one or more configuration message comprising discontinuous reception (DRX) configuration parameters associated with a first MBS service and semi-persistent scheduling (SPS) configuration parameters associated with a second MBS service;

receive first multicast broadcast data associated with the first MBS service based on scheduling information determined by monitoring a control channel using the DRX configuration parameters; and receive second multicast broadcast data associated with the second MBS service based on the SPS configuration parameters, wherein the SPS configuration parameters comprise an offset parameter indicating an offset of a hybrid automatic repeat request (HARQ) process, and wherein receiving the second multicast broadcast data comprises receiving the second multicast broadcast data based on the offset parameter.

* * * * *